United States Patent
Lahmann et al.

(10) Patent No.: US 10,496,695 B2
(45) Date of Patent: Dec. 3, 2019

(54) AUTOMATED DATA EXTRACTION FROM SCATTER PLOT IMAGES

(71) Applicant: think-cell Software GmbH, Berlin (DE)

(72) Inventors: Dominik Lahmann, Berlin (DE); Arno Schoedl, Berlin (DE); Jordan Ringenberg, Findlay, OH (US)

(73) Assignee: Think-cell Software GmbH, Berlin (DE)

( * ) Notice: Subject to any disclaimer, the term of this patent is extended or adjusted under 35 U.S.C. 154(b) by 184 days.

(21) Appl. No.: 15/613,326

(22) Filed: Jun. 5, 2017

(65) Prior Publication Data
US 2017/0351708 A1   Dec. 7, 2017

Related U.S. Application Data

(60) Provisional application No. 62/346,544, filed on Jun. 6, 2016.

(51) Int. Cl.
*G06K 9/46* (2006.01)
*G06K 9/66* (2006.01)
(Continued)

(52) U.S. Cl.
CPC ..... *G06F 16/5838* (2019.01); *G06K 9/00456* (2013.01); *G06K 9/00476* (2013.01); *G06K 9/4604* (2013.01); *G06K 9/6892* (2013.01); *G06T 7/11* (2017.01); *G06T 7/12* (2017.01); *G06T 7/13* (2017.01); *G06T 7/155* (2017.01); *G06T 7/74* (2017.01); *G06T 2207/10024* (2013.01); *G06T 2207/20076* (2013.01); *G06T 2207/30176* (2013.01)

(58) Field of Classification Search
None
See application file for complete search history.

(56) References Cited

U.S. PATENT DOCUMENTS

2004/0253616 A1* 12/2004 Wong ............... G01N 15/1475
                                                       435/6.12
2007/0255512 A1* 11/2007 Delenstarr ............ G06F 19/28
                                                        702/35

(Continued)

OTHER PUBLICATIONS

Curve Snap https://www.youtube.com/watch?v=JBlUilJdM84 (Year: 2014).*

(Continued)

*Primary Examiner* — Randolph I Chu
(74) *Attorney, Agent, or Firm* — Harness, Dickey & Pierce, P.L.C.

(57) ABSTRACT

The invention relates to a computer-implemented method for automatically extracting data from a scatter plot. The method comprises receiving a digital image of a scatter plot; analyzing the received digital image for identifying a plurality of pixel sets, each pixel set being a group of adjacent pixels; analyzing the pixel sets in the received image or in a derivative of the received image for generating a plurality of templates; comparing the templates with pixels of a target image for identifying matching templates; identifying data points for the identified similar templates; assigning to each identified data point a data series; and returning the identified data points.

22 Claims, 6 Drawing Sheets

(51) Int. Cl.
*G06F 16/583* (2019.01)
*G06K 9/68* (2006.01)
*G06K 9/00* (2006.01)
*G06T 7/13* (2017.01)
*G06T 7/73* (2017.01)
*G06T 7/11* (2017.01)
*G06T 7/12* (2017.01)
*G06T 7/155* (2017.01)

(56) References Cited

U.S. PATENT DOCUMENTS

2008/0310692 A1* 12/2008 Robinson ............. G06K 9/0014
 382/128
2012/0165215 A1* 6/2012 Andersen ............. C12Q 1/6837
 506/9
2015/0362908 A1* 12/2015 Lee ................... G05B 19/41875
 700/110
2016/0331248 A1* 11/2016 Satish ................ A61B 5/14546
2017/0024827 A1* 1/2017 McGill .................. G06Q 40/08

OTHER PUBLICATIONS

Origin Lab® Origin https://www.youtube.com/watch?v=RylK7PFLbll (Year: 2013).*
DcsDigitiser Graph Digitizer https://www.youtube.com/watch?v=-GW5ETRWcBs (Year: 2015).*
WebPlotDigitizer Tutorial 3.6+, https://www.youtube.com/watch?v=P7GbGdMvopU (Year: 2015).*
Digitizing Precip Charts: A Tutorial with DataThief, https://www.youtube.com/watch?v=HESb4n_XrIQ (Year: 2014).*
Engauge Digitizer—Convert Images into Useable Data, Engauge Digitizer—Convert Images into Useable Data, https://www.youtube.com/watch?v=EZTlyXZcRxl (Year: 2014).*

* cited by examiner

AUTOMATED DATA EXTRACTION FROM SCATTER PLOT IMAGES

CROSS-REFERENCE TO RELATED APPLICATIONS

This U.S. Non-Provisional application claims benefit under 35 USC § 119 to U.S. Provisional Application No. 62/346,544 filed on Jun. 6, 2016 in the USPTO, the entire contents of which is incorporated by reference in its entirety.

FIELD OF THE INVENTION

This application relates generally to the field of data processing, and more particularly to the extraction of data from scatter plot images.

BACKGROUND AND RELATED ART

To simplify the understanding, data is typically represented graphically in all kinds of electronic as well as paper-based media. For example, charts are commonly used for presenting data on web pages, online- and print magazines. Charts depicted in print media can be digitized by capturing the chart with a camera or a scanning device for providing a digital representation of the chart. A large variety of different chart types exists, e.g. bar charts, pie charts, doughnut charts or the like. Charts of a particular type, e.g. a scatter plot, may vary greatly e.g. in respect to the colorings or textures, the size, type and position of scatter points, the position and design of text labels and other criteria.

In case the data that is graphically represented in a digital scatter plot image shall be used as a basis for further data processing, e.g. statistical analyses, or to be visualized in a user-specific way, the data values represented in the scatter plot currently need to be entered in a computer system manually. For example, the x and y positions and the axis or data point labels may be entered with a real keyboard or virtual keyboard (especially keyboards displayed on a tablet PC's or smartphone's touchscreen of limited size and functionality). Entering said data manually can be cumbersome and error prone, in particular for large scatter plots comprising dozens or even hundreds of data points.

The complexity and diversity of digital scatter plots has hitherto precluded a completely automated extraction of data from scatter plots. Thus, in many cases a user had to type in the data represented by a scatter plot in a target application by hand.

Existing programs for digitizing plot images do not fully-automatically extract data points and/or fully-automatically identify plot axes. Further, these programs do not automatically identify the maximum and minimum values of axes ranges. Finally, these programs do not automatically identify chart titles, series names, or axes labels. It is therefore not possible to quickly and accurately extract data from plot images using existing programs.

SUMMARY

Embodiments of the innovation may provide an improved method, computer program product and system for extracting data from a scatter plot image. Corresponding methods, computer program products and computer systems are specified in the independent and dependent claims. Embodiments of the present invention can freely be combined with each other if they are not mutually exclusive.

In one aspect, the invention relates to a computer-implemented method for automatically extracting data from a scatter plot. The method comprises:
  receiving a digital image of a scatter plot;
  analyzing the received digital image for identifying a plurality of pixel sets in the received scatter plot image or in a derivative of the received image, each identified pixel set being a group of adjacent pixels;
  analyzing the identified pixel sets for generating a plurality of templates, each template being a pixel structure that depicts one single data point symbol, each template representing a respective data series;
  comparing each of the templates with pixels of a target image, the target image being the received scatter plot image or the derivative of the received scatter plot image, for identifying positions of matching templates, a matching template being a template whose degree of similarity to pixels of the target image exceeds a similarity threshold;
  at each position in the target image where a template match occurred, identifying a data point for the matching template and assigning to the identified data point one of the data series; and
  returning the identified data points and the data series to which it is assigned.

Said features may have multiple advantages:

The accuracy of identifying individual data points in a plot and of identifying the data series a data point belongs to may be greatly increased. In particular, the method may be much more robust against data point detection errors and data series assignment errors which may result from an overlap of two or more data points of the same or of different data series. For example in case a clustering algorithm is applied on the plot for identifying the data points and their respective series in a single clustering step, the problem arises that overlapping data points may be erroneously identified as a new type of data point symbol and as a new type of data series. This may be prevented by identifying templates which respectively comprise a (single) data point symbol (of the data series represented by said template), and then using said templates in a further, separate step for identifying the actual data points (data series instances).

By increasing the accuracy of the data point extraction as described above, embodiments of the invention allow for a fully automated identification and extraction of data points and their respective data series from any kind of digital image that represents a scatter chart, e.g. a photograph of a plot depicted in a print magazine, a screenshot of a spreadsheet application that displays a scatter plot, a pixel graphic or vector graphic of a plot downloaded from the internet, etc. The user may not be required to control the data extraction process and/or to interact with a graphical user interface (GUI) in order to exert control. At least, the number of user-interactions may be reduced. Automatically or at least semi-automatically extracting data values of scatter plot images can be beneficial as time is saved and errors resulting from an erroneous user-action may be avoided. For example, it may not be necessary to manually select chart elements that were overseen by the algorithm and it may not be necessary to manually correct wrong assignments of data points to series manually. Especially on devices with small displays and/or with touch-input only, it is hard to select chart elements precisely by hand.

Moreover, the increased accuracy of the data point identification method according to embodiments of the invention may allow the automated data extraction ("digitization") of the information content of scatter plots even in case the plot image comprises various artifacts such as dark lines resulting from errors in the scanner or from dust in the optics of the camera that was used for taking the plot image, dark gradients resulting from a print magazine that does not contact the surface of an optical scanner homogeneously, and the like.

In particular, embodiments of the invention have been observed to be more robust against data point identification and data series assignment errors resulting from an overlap of two or more symbols of the same or of different data series in the plot.

Embodiments of the invention may be more robust against the above mentioned and other error sources, because the identification of the data points and their respective data series is performed in a particular method involving multiple steps. At first, information contained in the image is used for automatically extracting templates comprising a symbol that represents one single data series. Then, said clearly defined templates are used for identifying individual data points (i.e., data series instances) in the plot. Said approach prevents that an overlay of multiple data series symbols is erroneously considered as a new symbol representing a respective data series. For example, in case a plot depicts data points of two data series whose data points are respectively represented by red triangles or black circles, in a first step a first template for red triangles and a second template for black circles would be extracted and said two templates would then, in further steps, be compared against pixel patches of the plot image for identifying instances of the two data series. Two data points of different data series may be very similar and their respective symbols may partly overlap in the plot. The resulting "combined shape" of the red triangle and the black circle may represent an artificial structure that could possibly be considered as a data point of a third data series (represented by a red-black overlay of a triangle and a circle). However, as only a "red triangle template" and a "black circle template" are generated and used for identifying data series instances in the plot, the risk of erroneously identifying data points of a further data series may greatly be decreased.

Moreover, the above features may prevent that a data point overlapping with other graphical image components, e.g. axes, legend, text, etc. is missed.

The above described features may be descriptive of an image analysis method that comprises at least two steps: A first step of analyzing the plot image for identifying adjacent pixel sets, e.g. "pixel blobs", and a second step of extracting templates from the identified pixel sets, whereby each template comprises a single data point symbol that represents a respective data series. Each symbol may be describable by visual features such as coloring, morphology, size, shape, etc. Then, all or at least some pixels of the received scatter plot image or a derivative thereof are compared with the templates. The image to which the templates are compared is referred herein also as "target image". Thus, at least some image regions of the target image are analyzed for extracting, in a separate step, the individual data points and the data series they belong to with the help of the templates. Thereby, the accuracy of data point identification and of data series assignment may be greatly increased.

The pixel sets are identified in the received scatter plot image or in a derivative thereof for identifying graphical objects in the scatter plot image. Each identified pixel set is assumed to represent a respective graphical object in the scatter plot image. The received digital image may have multiple forms, e.g. a binary ("black and white") image, a single-channel ("graylever") image or a multi-channel (e.g. RGB or (MYK) image. Optionally, a multi-channel image may be transformed into one or more single-channel images and/or the one or more single-channel image may be transformed into a binary image in additional processing steps that are performed for preparing the image data for identifying the graphical objects in the form of pixel sets in the received digital image.

In case one or more derivative images, e.g. a binary image, is created, the template matching can be performed on a derivative image (which is typically faster) or on the original image (which is typically more accurate as it may comprise more information than a derivative image). Depending on the form of the received image and other factors (e.g. whether high accuracy or high performance is preferred), different kinds of pixel set detection algorithms, template matching approaches and/or data series assignment approaches can be applied.

Pixel Set Identification: First Approach

According to some embodiments, the identification of the pixel sets comprises:
  identifying a plurality of pixel blobs in the received digital image or in the derivative image, each pixel blob being a group of adjacent pixels with similar image features; and
  using the identified pixel blobs as the pixel sets.

Thus, according to the above mentioned approach, the pixel sets are identified such that pixels within a pixel set are more similar to each other than to pixels outside of said pixel set. For example, all groups of adjacent pixels which have the color "red" may be identified as pixel sets and all groups of adjacent pixels which have the color "blue" may also be identified as pixel sets. Instead of the color feature, also texture features and/or intensity features (e.g. for single-channel images) may be analyzed for identifying sets of adjacent pixels being more similar to each other in respect to at least one visual feature than to other, surrounding, pixels (identified as pixels which are not element of but rather surround the pixel set)

Thus, at least according to the above approach and in some cases also according to the contour-mapping based approach discussed below, the pixels within a pixel set have similar image features, whereby an image feature can be, for example, a coloring feature, a brightness feature, a contrast feature, etc. In the first approach, the visual feature similarity may be used as a criteria for identifying pixel sets. In the contour mapping based approach, similarity of visual features of pixels within the same pixel set may simply be the consequence of pixels within the same graphical object typically being more similar to each other than to the background.

The identification of pixel sets based on similar adjacent pixels can be performed e.g. by means of a connected component analysis which may be performed e.g. on an original multi-channel scatter plot image. For instance, the connected component analysis may be performed on an RGB scatter plot image. Alternatively, the identification of pixel sets based on similar adjacent pixels can be performed on a derivative image, e.g. a grayscale or binary black-white image.

Pixel Set Identification: Second Approach

According to alternative embodiments, the pixel sets are identified not by grouping adjacent pixels with similar visual features together, but rather by computing one or more derivative images from the received image. The received image can be, for example, a single-channel grayscale scatter plot image or a multi-channel scatter plot image. An image analysis logic generates the derivative image of the received scatter plot image by transforming the received scatter plot image into a derivative image. For example, the derivative image is an edge image that depicts contours of graphical objects in the scatter plot image. For instance, the derivative image can be a binary image, whose connected "ON" pixels represent edges and/or contours of graphical objects in the plot image.

The identification of the pixel sets is performed by mapping the identified contour pixels to respective pixels in a template-generation-image. The template-generation-image is the received scatter plot image or a derivative version of the received scatter plot image, e.g. a grayscale image. Then, the image analysis logic uses all pixels in the template-generation-image to which a contour of a graphical object is mapped or which lie within the mapped contour of said graphical object as one of the identified pixel sets. The pixel features of the template-generation-image may later be used for generating the templates, e.g. by the first and second template generation approach described herein for embodiments of the invention.

For example, the contours of the graphical objects in the edge image may be circles, ellipses, polygons or the like. After having mapped the contour pixels to the template-generation-image, not only the mapped contour pixels but also the pixels within a connected and closed contour are considered as pixels belonging to the same pixel set (irrespective of the similarity of their visual features). Thus, the pixels within the template-generation image onto which the contours are mapped may have different colors, etc., but are within a contour as computed e.g. by a morphological filter (because different colors may have identical or similar grayscale values, and even more likely the same values in a binary image).

Using a template-generation image that comprises some coloring features, morphological features etc. may allow the creation of templates depicting graphical objects which also have sonic coloring and/or morphological features and which may yield more accurate results during template matching.

According to an alternative approach, the image analysis logic directly uses all pixels in the edge image which are contour pixels of a graphical object or which lie within the contour of said graphical object as one of the identified pixel sets. As the pixel sets are directly identified in the edge image, a mapping may not be necessary. Then, the image analysis logic may perform the template generation with the pixel sets identified in the edge image.

According to embodiments, the contour pixels of a graphical object are identified by a connected component analysis in the edge image.

For example, the contours may be a set of adjacent pixels which are enclosed by a pixel boundary that exceeds a minimum contrast level to the pixels within the contour. The generation of an edge image may have the advantage that each 'pixel set' may represent a single or a collection of overlapping graphical objects of the image. Thus, identifying pixel sets by computing edge images and mapping edge images back on the template-generation image may have the advantage that pixel sets representing graphical objects having various visual features may be identified in this initial step.

According to embodiments, the received image is a binary image. A "binary image" as used herein is an image whose pixels have one of only two possible intensity values, e.g. "1" or "0" which typically represent "white" or "black". Thus, a binary image may also be referred to as black-white-image. Using a binary image for identifying the pixel sets may be advantageous as the performance may be increased.

According to other embodiments, the received digital image is a multi-channel-image (e.g. an RGB image) and the method comprises creating the binary image from the multi-channel image. The comparison of templates with pixel sets (or image patches) is preferably performed with pixel sets (or image patches) of the multi-channel-image of the scatter plot.

To the contrary, the identification of the pixels for generating the templates is preferably performed on the binary image that is derived from the original multi-channel image or at least processes the binary image for correctly identifying connected components in the binary image. After contours were identified in the binary image, the contours are mapped to the template-generation image, e.g. the originally received RGB or grayscale scatter plot image, for generating the templates. Preferably, the comparison of the generated templates with the pixels of the scatter plot is performed on the multi-channel scatter plot image.

Performing the template comparison on a multi-channel image (if available) rather than on the single-channel-image(s) may be more accurate than performing the template matching with a binary (black and white) image because the color information may provide important information that prevents erroneous matches (e.g. red circle matches with blue circle because the color information is gone). If the original image is already black and white, the pixel set identification, the template generation as well as the template matching and data point identification may be performed in the original (already binary) image.

According to still other embodiments, the received digital image is a single-channel grayscale image, i.e., an image where each pixel may have an intensity value that is within a range of allowed intensity values, whereby the range may comprise more than two values.

According to some embodiments wherein the received image is a single-channel grayscale scatter plot image or a multi-channel scatter plot image, the method further comprises:

generating the derivative of the received scatter plot image by transforming the received scatter plot image into a single-channel grayscale image or generating the derivative of the received scatter plot image by transforming the received scatter plot image into a binary image; For example, a multi-channel image may be transformed in one or more steps to a binary image or a grayscale image; a grayscale image may be transformed into a binary image. In each case, the amount of information contained in an image may be reduced. This may accelerate and facilitate the identification of the pixel sets which is preferably performed in the derivative scatter plot image; Thus, the analysis of the received image for identifying the pixel sets may comprise generating a derivative scatter plot image that is further processed and analyzed for identifying the pixel sets in the derivative scatter plot image and not in the originally received scatter plot image;

performing the identification of the pixel sets in the scatter plot image or in the derivative image (also referred to as "derivative scatter plot image") and mapping the identified pixel sets to respective pixel sets in the received scatter plot image or in a derivative image, wherein the comparing of the templates with the pixel sets is performed in the pixels of the received scatter plot image or in the derivative image to which the identified pixel sets are mapped.

The template generation and the template matching is preferably performed in a multi-channel or grayscale scatter plot image as this image versions allow identifying matching templates with high accuracy. In case the contours of graphical objects are identified in another image version of the scatter plot than the image used for template generation, a mapping step is performed to map the identified contours to the template-generation image. It should however be noted that other embodiments are also possible wherein the graphical object identification, template generation and template matching (i.e., the comparing of templates with pixel sets or image patches for identifying similar ("matching") templates whose pixels are similar with pixels in the scatter plot image) is performed on the same image.

According to embodiments, binary (black-and-white) images are generated as an intermediate step to the extraction of the connected components, i.e. pixel sets, for reducing the color information. Then, all white, repetitive black (depending on the definition) "pixel blobs" are used as "masks" which identify respective pixel sets in the multi-channel image which are further processed for extracting the templates and for performing the template mapping.

According to embodiments, the method further comprises creating the binary image. The creation of the binary image comprises:
  receiving a multi-channel image of the scatter plot;
  decomposing the received multi-channel image into multiple single-channel images;
  creating an edge image from each single-channel-image, each edge image selectively comprising pixels being indicative of the contours of graphical objects depicted in the received digital image, if any;
  generating a composite grayscale image by determining, at each pixel position in the received digital image, the maximum pixel value of all created edge images, and by storing said determined maximum at the corresponding pixel position;
  transforming the composite grayscale image into the binary image. For example, the transformation can be performed by applying one or more threshold computations, like global statistical mean and standard deviation of pixel intensities.

For example, an originally received RGB scatter plot image may comprise several pixel blobs filled with red pixels. The RGB image may be decomposed into three grayscale images and the red pixel blobs of the received RGB image are represented as gray blobs in the "red" single-channel image. Then, this single-channel image is transformed into an edge image wherein each "gray pixel blob" of the "red" single-channel-image is transformed into a non-filled ("empty") circle, e.g. a white circle on black background. This circular edge is then mapped to the image on which the template matching is to be performed, e.g. the originally received RGB image or the single channel image. All pixels in the image onto which the circular edge is mapped or which lie just below or within the mapped edge pixels are considered to represent a "pixel set".

For example, the identification of the pixel sets is performed in the binary image and the comparing the templates with the pixel sets in the received image comprises mapping the identified pixel sets to the received multi-channel-image and performing the comparing of the templates with the pixel sets in the multi-channel-image to which the pixel sets in the binary image are mapped.

For example, each single-channel-image may selectively comprise intensity values of a single color channel. According to some examples, the original multi-channel plot image may be an RGB image comprising the three channels red, green and blue. In this case, three single channel images may be generated (a red, a green and a blue channel image). Then, an edge image is created from each of the single channel images, e.& by applying an edge detection algorithm on each of the single-channel-images. For instance, the edge detection algorithm may involve the computation of a morphological gradient for the pixels in each single-channel-image.

According to some embodiments, the edge image of each of the single-channel images is computed by computing the difference between the single-channel-image and a dilated version of said single-channel-image. Alternatively, the edge image is computed by computing the difference between the single-channel-image and an eroded version of said single-channel-image. Alternatively, the edge image is computed by computing the difference between an eroded version of the single-channel-image and a dilated version of said single-channel-image.

An "edge image" of a pixel image is a grayscale or binary image indicating the sharpness of change in the pixel intensity values at each pixel position. An edge image can contain edges and contours, whereby a contour is a set of adjacent pixels in the edge image having at least one property in common (e.g. "ON" or "OFF" state) and representing the border of a graphical object.

A "contour" as used herein is a set of adjacent pixels forming the boundary of a graphical object.

A "single-channel image" as used herein is a grayscale image version of an original image. The original image may have multiple channels, e.g. multiple color channels. For example, the original image can be an RGB image that is decomposed into a red single-channel image, a blue single-channel image and a green single-channel image.

A "derivative image" of a digital image is a processed version of said digital image. For example, a grayscale image or a binary image, e.g. an edge image, of a received digital image is a derivative image of said received digital image.

The terms "image erosion" and "image dilation" relate to the two fundamental operations in morphological image processing. Dilation is a shift-invariant (translation invariant) operator, assigning to a pixel the minimum intensity value of some surrounding pixels. Erosion is a shift-invariant (translation invariant) operator, assigning to a pixel the maximum intensity value of some surrounding pixels.

According to embodiments, the identification of the pixel sets comprises performing a connected-component-analysis of the (received or generated) binary image for identifying a plurality of connected components in the binary image. Each connected component is a group of adjacent pixels having similar or identical image features, e.g. with similar or same intensity values. The method further comprises using the identified connected-components as contours of graphical objects of the scatter plot and using contour pixels and pixels surrounded by the contour pixels in the edge image (or respectively mapped pixels in the received image or a derivative image thereof) as the pixel sets.

For example, in case the connected-component-analysis is performed on a binary image each pixel has one of two states. In this case, the connected components preferably are pixels with the same pixel intensity value.

The term "connected-component analysis" (alternatively connected-component labeling, blob extraction, region labeling, blob discovery, or region extraction) is an algorithmic application of graph theory, where subsets of connected components (e.g. adjacent pixels in a pixel image) are uniquely labeled based on a given heuristic. Connected-component analysis may be used for detecting connected regions in digital images. For example, the connected components may be pixel blobs of adjacent pixels with similar visual features which are directly used as the "pixel sets". Alternatively, the connected components may be contours in an edge image and the contour pixels in combination with the pixels surrounded by a respective contour may be used as the "pixel sets". Likewise, the edges and contours identified in the edge image can be mapped to the received image and the pixels of the received image to which the "pixel sets" in the edge image are mapped can be used for generating the templates.

A "data point" as used herein is a single member of a data series, e.g. a single member of a statistical population. For example, in a study of the determinants of money demand with the unit of observation being the individual, a data point might be the values of income, wealth, age of the individual, the number of dependents. A data point can be represented in a plot by a symbol, e.g. a triangle, a dot, a square or any other graphical structure, whereby each representation of a data point in a plot may comprise multiple pixels ("data point pixels").

Preferably, the connected component analysis for determining contours is performed on a binary image, while color images of the scatter plot may preferably be processed for identifying pixel sets based on visual feature similarity of pixels. For example, a connected component analysis may be performed on the digital (black-white) image version derived from an original ROB image of the scatter plot or may be performed directly on the original multi-channel image. The generation of the derived image may be performed by an image transformation method.

Template Extraction: First Approach.

According to embodiments, the generation of the templates comprises analyzing the identified pixel sets for identifying and filtering out one or more pixel sets whose position, coloring, morphology and/or size indicates that said pixel set cannot represent a data point. Thereby, plot labels, gridlines and/or axes or other objects and artifacts which do not represent data points are filtered out. If a multi-channel image of the scatter plot was received, the analysis is preferably performed on pixels in the multi-channel image onto which the pixel sets identified in the derived image were mapped. If the received image was already a binary image, the analysis for identifying the pixel sets can likewise be directly performed on the received image.

Already at this step, some pixel sets representing an overlap of symbols of two or more data points may be filtered out, but some overlapping data points and other pixel sets which do not represent an individual symbol of an individual data point may still remain and will be eliminated in the next step(s).

The template generation further comprises selectively using the non-filtered out pixel sets for generating template candidates. Each template candidate comprises or consists of one of the non-filtered out pixel sets, whereby each template candidate depicts a graphical object that represents a single data point symbol or a combination of data point symbols or other objects other than a single data point symbol.

Said steps may be beneficial as many sources of error may already be removed: blobs which are very long in one dimension but very short in the orthogonal dimension probably relate to axes or scratches on the plot or other artifacts and do not represent a data point symbol. If the position of the pixel set or sets used for generating the template candidate indicates that the respective pixel sets were located outside of the plot area, the corresponding template candidate may be filtered out. The filtering can be implemented, for example, in the form of rules executed by a rules engine.

Candidate templates are pixel structures that depict a graphical object, whereby the graphical object may or may not depict a single data point symbol. The candidate templates are processed and filtered in a first step for filtering out candidate templates which cannot, given the particular size, shape or other visual features of the depicted graphical object, depict a single data point symbol. However, the above mentioned filtering step may not remove (all) blobs which represent an overlay of two or more data point symbols or which represent other image objects and artifacts having a similar size and/or appearance like a data point symbol, so these template candidates may remain as potential sources of error. Nevertheless, in case the scatter plot is free of any overlays of multiple data point symbols, filtering out template candidates based on coloring, position, size or morphology of a pixel set may be sufficient for an error-free, accurate identification of data points and their respective data series. In this case, the template candidates that were not filtered out can be used as the templates.

According to embodiments, the generation of the templates further comprises determining the occurrence frequency of each of the graphical objects represented by each template candidate in the scatter plot (e.g. by similarity in respect to shape, coloring, morphology, size, etc.), and identifying and filtering out template candidates comprising a graphical object whose occurrence frequency in the scatter plot is below a threshold. Thereby template candidates being a graphical object that represents an overlay of two or more data point symbols and template candidates depicting other rarely occurring objects are filtered out. Then, the non-filtered out template candidates are selectively used as the "templates", wherein each template comprises one graphical object that is one (single) data point symbol.

For example, a template may be a pixel matrix of 50 px×50 px comprising a graphical object that is a red star. Only the pixels lying within the graphical object may have assigned visual features like coloring, morphological features, etc. while all other pixels of the template may not have assigned any feature that is evaluated when the similarity between the template and an identified pixel set or an image patch that may comprise a pixel set is determined. According to another example, the template may consist of the pixels of the graphical object.

In this case, the template has the same dimension and shape as its graphical object, e.g. a star, a circle, a rectangle, or the like.

Determining the occurrence frequency of a graphical object of a particular template candidate for distinguishing "valid" templates whose graphical objects respectively depict one single data point symbol of a data series from template candidates whose graphical objects respectively depict a blob resulting from an overlay of two or more different data points or resulting from an artifact of similar size may be advantageous, because the occurrence frequency is typically much higher for the graphical objects depicted in the "valid templates" than for the graphical objects of the template candidates representing overlays of symbols or artifacts.

Embodiments of the invention may be particularly advantageous as the image analysis method can be performed without any knowledge of the number of data series and respective symbol types that are contained in a scatter plot.

Rather, as the algorithm uses a dynamically computed occurrence frequency for identifying and filtering out template candidates which do not represent the symbol of a single data series, the same image analysis and plot digitization algorithm may be used for a large variety of different scatter plots.

Template Extraction: Second Approach

According to embodiments, the generation of the templates comprises analyzing the identified pixel sets for identifying and filtering out pixel sets whose position, coloring, morphology and/or size indicates that said pixel set cannot represent a data point. Thereby plot labels, gridlines and/or axes, that cannot represent a single data point symbol, are filtered out. The method further comprises selectively clustering the non-filtered out pixel sets by image features into clusters of similar pixel sets. The image features are selected from a group comprising coloring features, morphological features and size. For example, all pixel sets which are red triangles may be clustered into a first cluster and all pixel sets which are black circles may be clustered into a second cluster. The method further comprises creating, selectively for each of said non-filtered out clusters, a graphical object that represents a data point symbol that is most similar to all pixel sets within said cluster and creating a template, whereby the created template comprises said graphical object as the one single data point symbol depicted in said template. For example, each feature like the color, a texture, a gradient, etc. of the graphical object represented by the cluster can be computed as the mean of the respective features of all pixel sets grouped into said cluster. The created templates may then be compared with the pixel sets for identifying completely or partially matching templates and for identifying data points at the locations in the plot where a partial or complete template match was observed.

Thus, also the cluster-based template generation approach may use a two-step filtering approach comprising at least a first filter step for filtering out pixel sets based on coloring features, morphological features, size or the like and comprising at least a second filter step for filtering out clusters whose low number of members indicates that the graphical object represented by said cluster occurs only rarely in the plot image and therefore is probably not a symbol of a data series.

Said feature may be advantageous, as the graphical objects that are depicted in the templates are created such that they optimally reflect the average feature values of all pixel sets in a particular cluster.

According to embodiments where a multi-channel scatter plot image was received, the identification of pixel sets is performed on a binary image that is created as a derivative of the received image. Then, the identified pixel sets are mapped to the originally received multi-channel scatter plot image and the pixel features of the multi-channel image to which the pixel sets are mapped is used for clustering the pixel sets of the originally received image. This may ensure that coloring and other important information is also considered during the clustering. In case the received image is already a binary image, the pixel set identification as well as the clustering may be performed on the received binary scatter plot image.

Template Matching

According to embodiments, the comparing of the templates with the scatter plot image is implemented as a sliding window method. For example, each template may be a pixel structure that is aligned to one of the corners of the digital image and a first comparison is performed between the pixels of the template and the sub-set of plot image pixels that are covered by the template pixels. Said sub-set of plot image pixels is also referred herein as "patch" or "image patch".

According to embodiments, the comparing each of the templates with each of said pixel sets or patches in the received scatter plot image or in a derivative of the received scatter plot image for identifying the templates whose degree of similarity exceeds the similarity threshold comprises moving the template across the scatter plot image or the derivative scatter plot image, thereby comparing the pixels of the template with the pixels of each currently covered patch of the scatter plot image or of the derivative scatter plot image, each patch being an image region of the scatter plot being currently covered by the template.

The comparing of template pixels with the image patch pixels may be implemented in any kind of "template matching" algorithm which determines the similarity between template pixels and image patch pixels of the received image or of a derivative of the received image. The "sliding window" is only one possibility to implement the template matching. It may be beneficial as also pixels of the received digital image are evaluated which may not be identified as elements of a pixel set in the pixel set determination step. This may increase accuracy, in particular in case the received image comprises many artifacts or is derived from a low quality scan.

The concept of using a "sliding window" for comparing templates and image patches as used herein for embodiments of the invention is not limited to a particular sequence of window movement steps, e.g. from left to right or from bottom to top. Many different window movement patterns are covered by the "sliding window" approach. For example, the windows may be randomly moved across the plot image or may be moved from bottom to top and/or from right to left. The movement steps may have a width of one pixel, two pixels or any other number of pixels (but preferably of a width of not larger than the window size).

Alternatively, each template is only compared with the pixels of already identified pixel sets. This approach may be faster and may be the preferred approach for high quality plot images with low noise. For example, each template may be a matrix of 50×50 pixels. The template pixel structure or "window" is aligned e.g. at the left upper corner of the pixel set and the pixel intensity values of the template pixels are compared with the respective pixels of the underlying patch for computing a similarity score between the template and the patch currently covered by the template. In case the similarity score exceeds a similarity threshold or meets another similarity criterion, the patch is considered to "match" with the template and is considered to comprise a data point that belongs to the data series that is represented by the template. Then, the template is moved a defined number of pixels, e.g. one pixel, to the right and/or to the bottom and a new similarity score is computed for the new patch that is currently covered by the window. These steps are repeated until the template has scanned the whole pixel set. In order to avoid that a particular pixel set is identified multiple times as a data point in multiple patches which have large overlap areas, additional steps can be performed for identifying the one of a plurality of overlapping patches having the highest similarity score and not considering the other overlapping patches as a match. The above described steps may be repeated with each of the created templates, so different templates will identify the data points of different data series in the plot.

The sliding window approach may have the advantage of highly accurately identifying the positions of data points in a plot, in particular in case the window is moved such that one step corresponds to a single pixel. Alternatively, the already identified pixel sets are compared in an all-against-all approach with each of the created templates. This may increase performance because regions of the plot image which are free of any pixel sets are not scanned.

However, as the number of templates is typically small and as the comparison of binary matrices can be executed by many processing units very fast, the sliding-window approach as well as the all-against-all template-vs.-pixel set comparison can be performed very quickly in a real time use case scenario.

According to embodiments, the comparison of the templates with the pixel sets or image patches is performed by a comparison function. The comparison is configured such that it computes and returns a similarity score for each pair of compared pixel set (or image patch) and template. After one of the templates was found to match with an image patch, at least one further one of the templates is compared with a copy of the image patch that lacks the pixels of the matching template for identifying also partially matching templates.

For example, multiple templates may match to a given pixel set (or image patch). According to embodiments, the matching templates are further evaluated for identifying partially matching templates. In some embodiments, only those templates are further processed in respect to a given pixel set (or image patch) whose similarity score exceeds a predefined similarity threshold. The further processing of the matching templates comprises creating a temporary image patch as a copy of the currently examined image patch (or pixel set), whereby the temporary image patch lacks all pixels which match to the matching template. Then, the similarity score is computed that indicates the similarity of the temporary image patch with the other matching template. The one of the other matching template that has the highest similarity score is then considered as a further, partially matching template. Optionally, a still further temporary image patch is created as a copy of the temporary image patch created in the previous step that also lacks the pixels of the further matching template. Then, all remaining matching templates are compared with the still further image patch for finding further partial matches. And so on until no further partial matches are identified.

That even a partial match of an image patch with a template may exceed the similarity threshold and yield a "match" may be advantageous as this feature may allow to correctly, identify data point symbols which are partially covered by another symbol. Thus, in case a scatter plot comprises a red triangle data point that is partially hidden by an overlaying black circle data point, the template for "red triangle symbols" may still yield a "match event" for the respective image patch, and also the "black circle template" will yield a "match event" for the same image patch. Thus, using a comparison function that returns a similarity degree that corresponds to a "match event" even in case only a fraction of the pixels of the templates actually match to pixels in the patch may allow to identify data points which are partially hidden by other data points.

Preferably, the comparison function returns a higher similarity score in case the matching pixels in the patch form a first coherent pixel region and in case the non-matching pixels in the patch form another coherent pixel region compared to the case when the matching pixels and non-matching pixels in a patch are randomly distributed and do not correspond to coherent regions of matching pixels and non-matching pixels.

According to embodiments, the minimum fraction of matching pixels is in a range of 10%-40% of the pixels of the template.

According to embodiments, the comparison identifies at least two templates which respectively have a degree of similarity to the pixel set contained in said image patch that exceeds the similarity threshold (and thus correspond to a "match"). In this case, a data point is created and returned for each of said at least two templates. Each of the at least two data points has assigned a different data series, whereby each data series is represented by the template for which the data point was created.

"Creating a data point" in this context may mean that pixels in the digital plot image are identified to represent a data point of a particular data series and a corresponding data object, e.g. a class instance or a data array is created and stored in the main memory and optionally also in a non-volatile storage medium. These created data points may then be stored in any data format of interest, e.g. as a table, as a comma delimited file, as a database record, or as a class object instance of an application program written in an object oriented programming language.

According to embodiments, the comparing of the pixels of the template with the pixels of each currently covered patch of the scatter plot comprises:
    calculating the correlation coefficient or normalized correlation coefficient between the image patch pixels and the template pixels; or
    calculating the cross-correlation or normalized cross-correlation between the image patch pixels and the template pixels; or
    calculating the sum of squared differences or normalized sum of squared differences between the image patch pixels and the template pixels.

For example, in each of the above approaches, a pixel can be represented as a numerical intensity value or a vector of numerical intensity values, e.g. a three-element vector for RGB images, whereby the above approaches may be applied and accumulated per channel.

The "correlation coefficient" indicates the strength of a statistical relationship between two variables, in this case between the pixel intensity values of the pixels of the template and the pixel intensity values of the plot image pixels in the currently covered patch ("patch pixels").

The "cross-correlation" is a measure of similarity of template pixel intensity values and patch pixel intensity values as a function of the displacement of one relative to the other. This is also known as a sliding dot product or sliding inner-product.

The "sum of squared differences" refers to the mean squared error (MSE) or mean squared deviation (MSD). It measures the average of the squares of the errors or deviations that is, the difference between the pixel intensities of the template pixels and the pixel intensities of the patch pixels. The MSE is a measure of dissimilarity it is always non-negative, and values closer to zero indicate a higher degree of similarity between the patch and the template.

According to embodiments, each of the above mentioned approaches calculates a measure of similarity or dissimilarity between the pixels of the template T and the image patch I. In the following $T(x,y)$ denotes the pixel intensity value of the template or of one channel of a multi-channel template at pixel position $x,y$. $I(x,y)$ denotes the pixel intensity value of the image patch or of one channel of a multi-channel image patch at pixel position $x,y$. Every pixel position $x,y$ in the template can be mapped to a pixel position $x,y$ in the image patch and vice versa.

The measures of similarity and dissimilarity S are calculated as summation is done over the template's /the image patch's pixel positions x,y:

method "sum of squared differences":

$$S = \sum_{x,y} \|T(x, y) - I(x, y)\|^2$$

method "normalized sum of squared differences":

$$S = \frac{\sum_{x,y} \|T(x, y) - I(x, y)\|^2}{\sqrt{\sum_{x,y} T(x, y)^2 \cdot \sum_{x,y} I(x, y)^2}}$$

method "cross-correlation":

$$S = \sum_{x,y} (T(x, y) \cdot I(x, y))$$

method "normalized cross-correlation":

$$S = \frac{\sum_{x,y} (T(x, y) \cdot I(x, y))}{\sqrt{\sum_{x,y} T(x, y)^2 \cdot \sum_{x,y} I(x, y)^2}}$$

method "correlation coefficient":

$$S = \sum_{x,y} (T'(x, y) \cdot I'(x, y)) \text{ where}$$

$$T'(x, y) = T(x, y) - \frac{1}{c} \cdot \sum_{x',y'} T(x', y'), I'(x, y) = I(x, y) - \frac{1}{c} \cdot \sum_{x',y'} I(x', y')$$

with c being the count of pixels in the template/image patch, x',y' being all pixel positions in the template/image patch.

method "normalized correlation coefficient":

$$S = \frac{\sum_{x,y} (T'(x, y) \cdot I'(x, y))}{\sqrt{\sum_{x,y} T'(x, y)^2 \cdot \sum_{x,y} I'(x, y)^2}}$$

with T' and I' as above.

After the function finishes the comparison, the best matches can be found as local minimums (when "sum of squared differences" was used) or maximums (when "correlation coefficient" or "cross correlation" was used). In case of a color image, template summation in the numerator and each sum in the denominator is done over all of the channels and separate mean values are used for each channel. Alternatively, sum of squared differences may be calculated as the sum of the squares of the norm of the difference between the color intensity vectors of a multi-channel template and the patch image. That is, the function can take a color template and a color image. The result is preferably a single-channel image, which is easier to analyze.

According to embodiments, the comparing of the templates with the image patches comprises generating downsized versions of the templates and generating a downsized version of the digital image. Then, a first comparison operation is performed. The first comparison operation comprises comparing patches of the downsized scatter plot image with the downsized template versions for identifying digital image regions of interest which are similar to one or more of the downsized templates. Then, a second comparison operation is performed. The second comparison operation is selectively performed for the identified digital image regions of interest. The second comparison operation comprises comparing patches of the original digital image with the original version of the one or more templates that are similar to the region of interest. Thereby, the degree of similarity is determined exactly for the currently examined patch of the original digital image and the one or more (original) templates whose downsized versions were identified as being similar to the region of interest.

Said features may be beneficial as performance may be improved and a real time interaction with a user via a GUI is enabled. This may be achieved by downscaling the problem in a first step, thereby reducing the search space of the original problem. The exact similarity score computation is not performed for each and every possible patch in the original image, but selectively for regions of interest identified in the first comparison operation.

According to embodiments, the generation of the downsized versions of the templates comprises checking if the dimensions of the templates are within a predefined dimension range. If the templates are larger than the predefined dimension range, the method comprises creating downsized template versions which fit into the predefined dimension range. The generation of the downsized version of the digital image comprises downscaling the received digital image by the same scaling factor used for downscaling the templates.

Downscaling the image in dependence on the downscaling of the templates may be advantageous as said feature may allow a fully automated selection of an appropriate scaling factor for a variety of different scatter plot images of different sizes and resolutions. Typically, the complexity of the symbols used in scatter plots, e.g. triangles, circles and the like can accurately be represented in a template of about 10×10 pixels to 50×50 pixels, e.g. 50×50 pixels. In case the plot image is so large that the automatically extracted templates and template candidates have a range of e.g. 200×200 pixels, the templates may be downscaled by the factor four, and also the digital image can be downscaled by said factor.

According to embodiments, the assigning of the data series to the identified data points comprises clustering data points in the target image (which have been identified with the help of the templates) in dependence on their size, morphology and/or coloring into clusters of data points having similar appearance. For example, all data points which look like red triangles are clustered in a first "red triangle cluster" and all data points which look like black circles are clustered in a second "black circle cluster".

According to an alternative embodiment, the assigning of the data series to the identified data points comprises assigning to each identified data point the data series represented by the template for which the data point was created. For example, the graphical object "red triangle" and the template comprising said graphical object may represent a first animal group being fed with a standard animal feed. The graphical object "black circle" and the template comprising said graphical object may represent a second animal group being fed with an improved animal food. A scatter plot may comprise pixels representing data points which indicate the size or weight of the different animal groups at a particular time or which indicate the number of animals having a particular weight or size e.g., a weight distribution plot or a size distribution plot).

In other words, the templates are used at least for identifying data points and may optionally also be used for identifying the series to which said data point is to be assigned.

According to embodiments, the method comprises exporting the position and the associated data series of all identified data points to a receiving software application. For example, the software application can be an office application. The extracted data can be exported to a spreadsheet application for further analysis, a charting application, and/or an application for generating a presentation or any other kind of office application program. For example, the data can be exported as a .CSV file to Microsoft Excel, PowerPoint or OpenOffice. The software application receiving the position and data series information can process the received information for generating and displaying said information in the form of a table or in the form of another plot or chart, e.g. another scatter plot or a bar chart, line chart, pie chart or the like. The newly generated plots or charts may have a special, customer-specific design. Thus, the information of scatter plots of many different sources, e.g. different print magazines using different color schemes and designs, can be automatically transferred into a predefined target design.

In addition, or alternatively, the position and the associated data series of all identified data points are stored to a storage medium, e.g. the main memory and/or a non-volatile storage medium, e.g. a hard disc.

In addition, or alternatively, the position and the associated data series of all identified data points are displayed in tabular form on a screen.

In addition, or alternatively, the identified data points are displayed as a newly generated scatter plot or chart with customized design on a screen. The customized design can be, for example, a predefined corporate design of a company that is used by default in presentations.

According to embodiments, the method according to embodiments of the invention is implemented as a plug-in, add-in or add-on of a spreadsheet application, an office application or of an application for generating electronic presentations.

In a further aspect, the invention relates to a tangible non-volatile storage medium comprising computer-interpretable instructions stored thereon. The instructions, when executed by a processor, cause the processor to perform a method for extracting data from a scatter plot. The method comprises:

receiving a digital image of a scatter plot;
analyzing the received digital image for identifying a plurality of pixel sets in the received scatter plot image or in a derivative of the received image, each identified pixel set being a group of adjacent pixels;
analyzing the identified pixel sets for generating a plurality of templates, each template being a pixel structure that depicts one single data point symbol, each template representing a respective data series;
comparing each of the templates with pixels of a target image, the target image being the received scatter plot image or the derivative of the received scatter plot image, for identifying positions of matching templates, a matching template being a template whose degree of similarity to pixels of the target image exceeds a similarity threshold;
at each position in the target image where a template match occurred, identifying a data point for the matching template and assigning to the identified data point one of the data series; and
returning the identified data points and the data series to which it is assigned.

In a further aspect, the invention relates to a computer system comprising one or more processors and memory comprising instructions stored thereon. The processors being configured for extracting data from a scatter plot, the extraction of the data comprising receiving a digital image of a scatter plot;
analyzing the received digital image for identifying a plurality of pixel sets in the received scatter plot image or in a derivative of the received image, each identified pixel set being a group of adjacent pixels;
analyzing the identified pixel sets for generating a plurality of templates, each template being a pixel structure that depicts one single data point symbol, each template representing a respective data series;
comparing each of the templates with pixels of a target image, the target image being the received scatter plot image or the derivative of the received scatter plot image, for identifying positions of matching templates, a matching template being a template whose degree of similarity to pixels of the target image exceeds a similarity threshold;
at each position in the target image where a template match occurred, identifying a data point for the matching template and assigning to the identified data point one of the data series; and
returning the identified data points and the data series to which it is assigned.

Embodiments of the present invention may enable users to extract source data from plot images. The method according to embodiments of the invention may automatically identify a set of components ("pixel sets") of such data plots (such as data points, axes labels, chart titles, series names, and the like), and may allow users to manually adjust, remove components from, or add components to the identified set of components (pixel sets) to form an updated set of components (updated pixel set). The updated set of components is then extracted to a data grid, and enable a user to view the data within the data grid, to update or edit the data in the data grid, and to generate one or more additional views or charts of the data in the data grid.

BRIEF DESCRIPTION OF THE. DRAWINGS

Figure 3A:
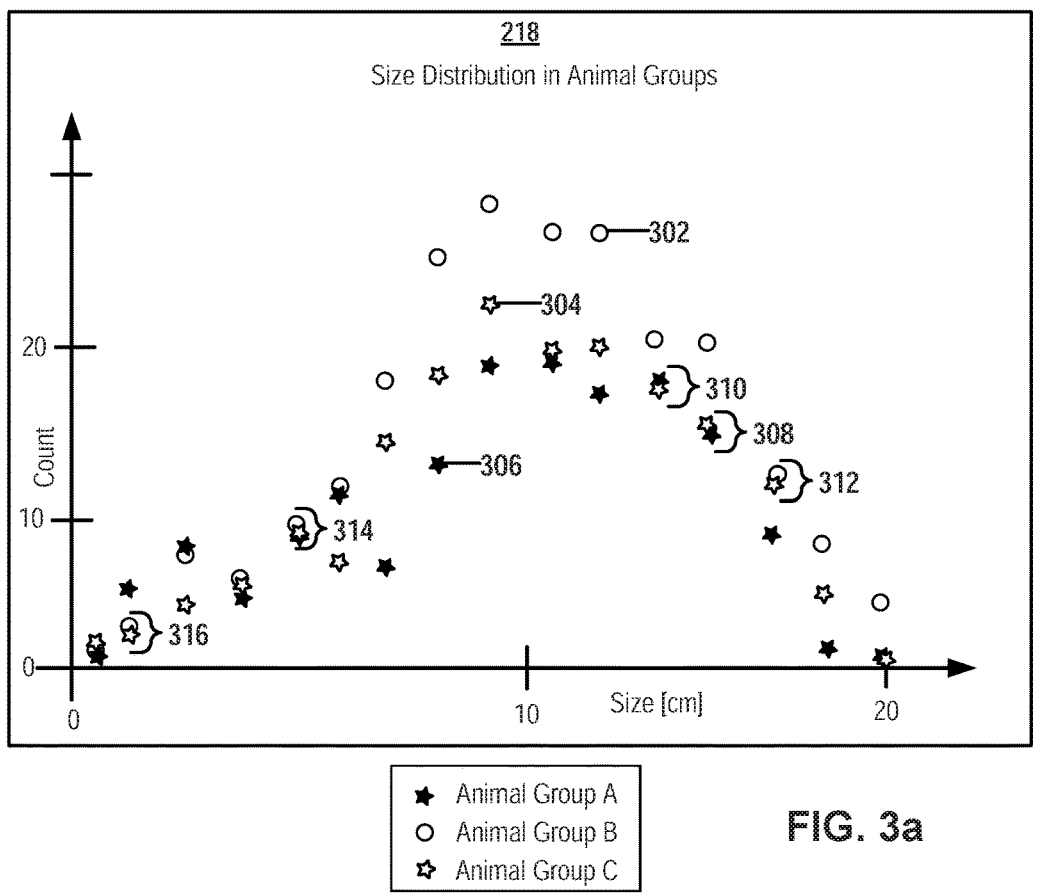
FIG. 3a depicts a scatter plot with data points of three different data series.

FIG. 4A-F depict the process of extracting data from the scatter plot of FIG. 3a, according to one embodiment.

Figure 5:
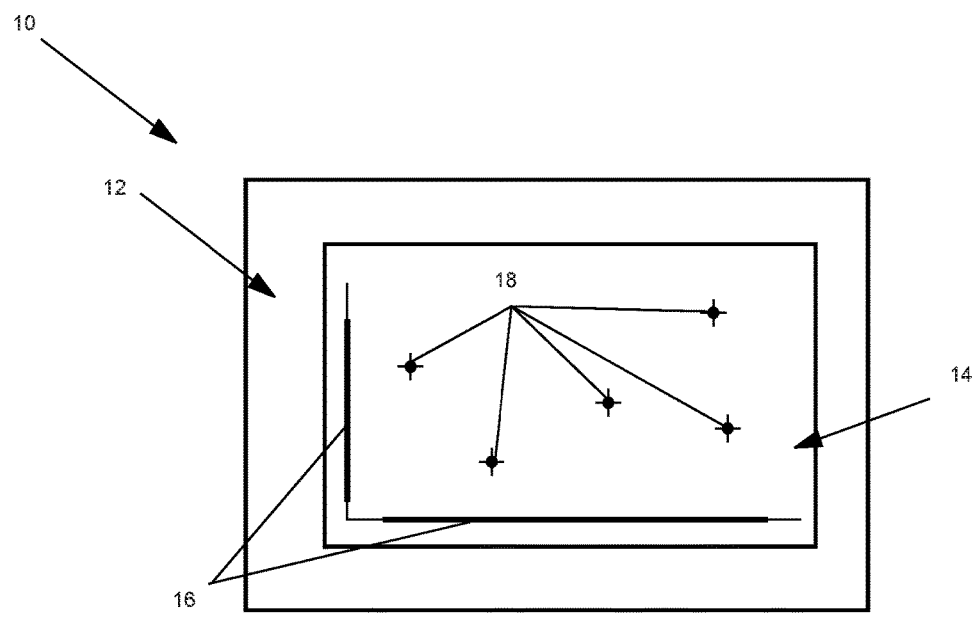

FIG. 5 illustrates an example scatter plot image for analysis and manipulation by the system and method described herein, according to one embodiment.

Figure 6:
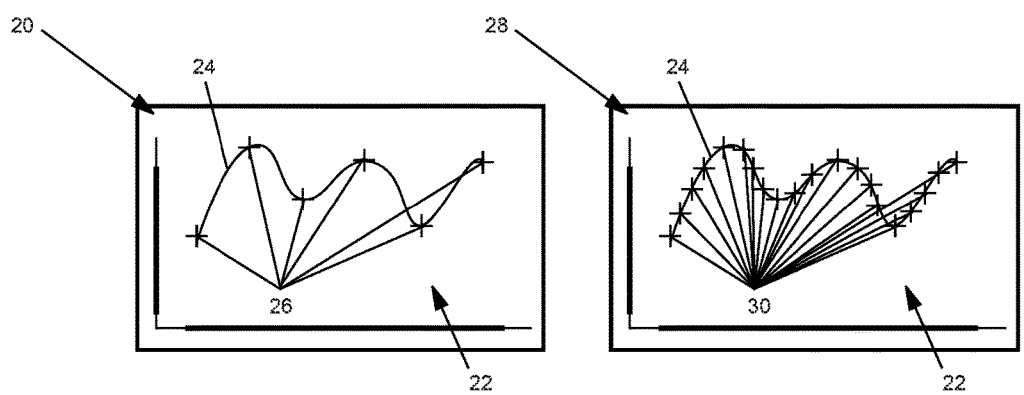

FIG. 6 illustrates example line charts for analysis and manipulation by the tools described herein.

Figure 7:
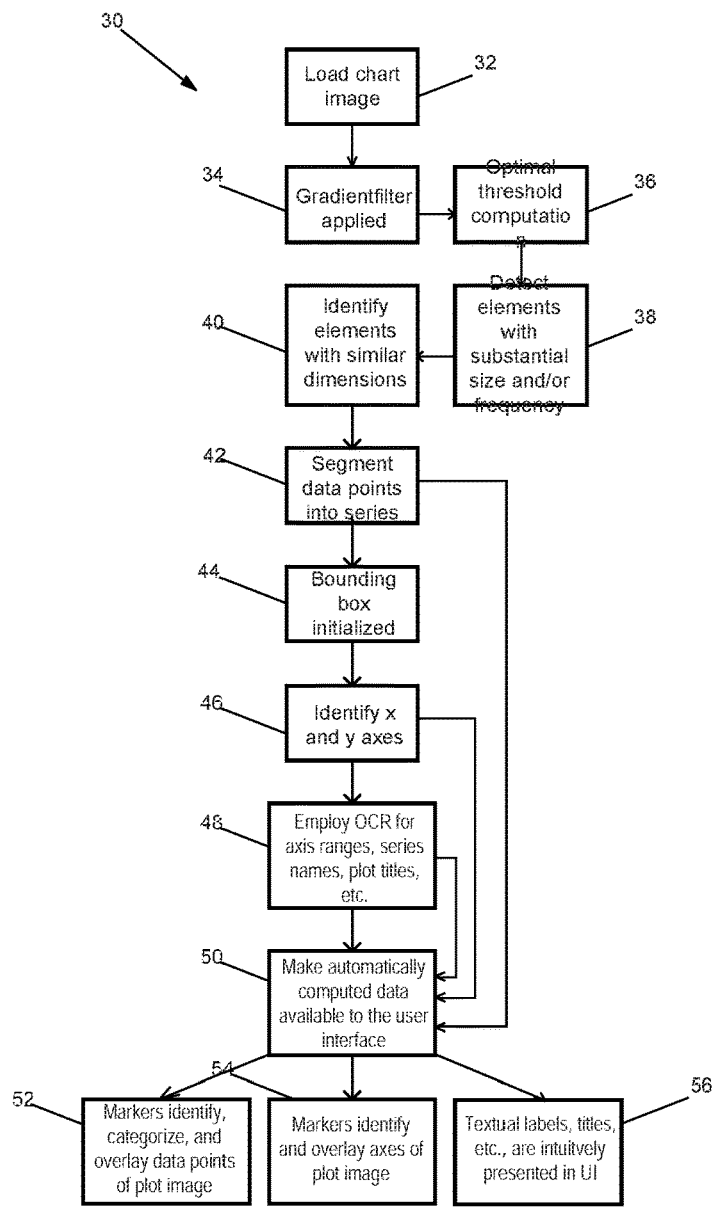

FIG. 7 is a flow chart illustrating a process for digitizing data representations, according to one embodiment.

DETAILED DESCRIPTION OF THE INVENTION

A "plot" or "chart" as used herein is a graphical representation of data, e.g. of data points, belonging to one or more data series. A chart can be, in particular, a scatter plot.

The term "coloring" as used herein refers to the color, shading, and/or intensity gradient of one or more pixels. In combination with other visual features such as morphological features, size and/or shape, the coloring may be used for identifying multiple instances of the same data point symbol or for determining a template that matches completely or partially with a pixel set or an image patch.

A "pixel structure", e.g. a template pixel structure, is a set of pixel that may have any shape. For example, a pixel structure can be a pixel matrix or a circle filled with pixels, a polygon or any other shape that is fully or partially filled with pixels.

A "chart image" or "plot image" as used herein is a digital image that depicts a chart. A plot image can be used as input for extracting data. A plot image and the chart depicted therein is not provided in the form of a special data object used by a charting application for processing and manipulating charts wherein the graphical chart elements and corresponding numerical data values are already stored in a well-organized, structured manner. Rather, a plot image is or comprises a matrix of pixels wherein each pixel has assigned at least one intensity, value, e.g. a binary value for binary images or a number within a predefined range for grayscale images or multiple values for multi-channel plot images.

The plot image may be provided e.g. as a vector graphic, that may be converted to a pixel graphic, or a pixel graphic, e.g. a .jpg file, a scan of a newspaper chart image or a picture provided by a remote server and presented in a browser. The chart may be displayed by the operating system alone or in interoperation with any kind of application program, e.g. a presentation program, a spreadsheet program, a browser, etc.

A "tabular data format" is a data format whose data is organized in rows and columns. A tabular data format may be, for example, a table or data in .CSV format which can be used by many data analysis programs (e.g. Excel, PowerPoint, OpenOffice etc.).

A "series" or "data series" as used herein is a set of data values, in particular number values that characterize a property of a particular class of objects. A chart can comprise multiple series. For example, a scatter plot may be descriptive of the gender of the students participating in two courses "biology" and "math" at a plurality of schools. The chart may comprise two groups (or "series") of data points for the two courses. Each data point in a group represents one school and course, consisting of two values, a first one representing the number of female participants, plotted along the vertical axis, and the second one representing the number of male participants, plotted along the horizontal axis.

A "scatter plot image" or "scatter chart image" is an image that comprises graphical elements representing data points and that may optionally include further graphical elements and/or representations of text that may convey additional data point labels, textual data value information, or further chart information like axes, legends, and/or descriptions. In addition, a scatter plot may comprise lines which connect some of the data points. Although said plots may also be referred to as "line plot", said plots will in the following also be referred to as "scatter plot", because embodiments of the invention focus on automatically identifying the individual data points and their series in the plot irrespective of the presence and position of one or more lines in the plot.

A "scatter plot" (also called a scatter graph, scatter chart, scattergram, or scatter diagram) is a type of plot or mathematical diagram using Cartesian coordinates to display values for typically two variables for a set of data. The data is displayed as a collection of data point symbols. The position on the horizontal axis and/or on the vertical axis may or may not be explicitly shown in the plot.

A "data point" as used herein is a data object that represents an element of a data series and that is represented graphically in the form of a symbol in the scatter plot. The symbol may in some cases be partially hidden by or overlap with other graphical elements of the chart. A data point comprises one or more data values, e.g. an x-value and a y-value and an assignment to a data series. At least some of the data values are represented in a scatter plot image by at least one graphical feature from a group consisting of horizontal position, vertical position, size, shape, coloring, morphology and combinations thereof.

Figure 1:
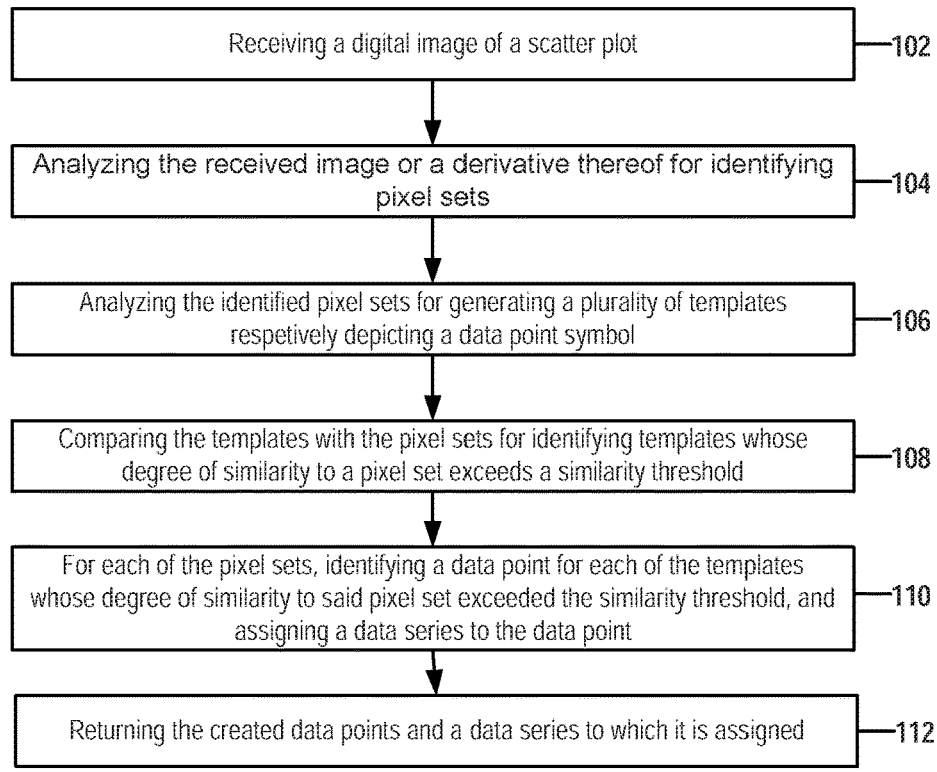
FIG. 1 is a flow chart illustrating a method of extracting data from a scatter plot, according to one embodiment.

FIG. 1 is a flow chart illustrating a method of extracting data from a scatter plot, according to one embodiment. The method can be implemented, for example, by a standalone software application or by a plug-in, add-in or add-on of an existing software application, e.g. MS Excel. The program logic that implements the image analysis and data extraction will in the following be referred to as "image analysis logic".

In a first step 102, the image analysis logic receives a digital image of a scatter plot. For example, the image analysis logic can read a JPEG RGB image that depicts a scatter plot from a storage medium or from a webpage that comprises the JPEG image. Alternatively, the image analysis logic can be coupled to an image acquisition system, e.g. a camera or a scanner, and receive the image from the image acquisition system. Then, the received image can optionally be processed for transforming the RGB image into a binary digital image. Alternatively, the digital image of the scatter plot can already be received in the form of a binary scatter plot image.

In step 104, the image analysis logic analyzes the received digital image or a derivative thereof in order to identify a plurality of pixel sets. Each identified pixel set consists of a group of adjacent pixels, whereby pixels which belong to the same pixel set are more similar to each other regarding their visual features (e.g. coloring, morphology, size etc.) than to pixels outside of the pixel set.

In step 106, the image analysis logic analyzes the identified pixel sets in order to generate a plurality of templates. The template generation may involve the generation of template candidates from which the finally used templates are selected in one or more filtering steps as described, for example, with reference to FIG. 4. Each template is a pixel structure that depicts exactly one data point symbol, e.g. a red triangle or a black circle. Thus, each template and respective data point symbol represents a respective data series, whereby all data points of a particular data series are assumed to be represented in the plot with the respective symbol of that series.

In step 108, the image analysis logic compares each of the templates with each of the pixel sets having been identified in step 106 (e.g. via a sliding window approach that compares templates with image patches, whereby the image patches comprise the pixel sets identified in step 106). For example, the comparison can be implemented in the form of a sliding window approach or in form of a comparison of already identified pixel sets with all identified templates. The comparison is performed in order to identify, for each of the pixel sets, one or more templates whose degree of similarity to the pixel set exceeds a similarity threshold. However, as each template represents the symbol of a single data series, pixel sets which correspond to artifacts or text labels will not be identified as data point. Moreover, in case the comparison logic supports the detection of "partial matches", a pixel set that corresponds to an overlay of the symbols of multiple data series will match with two or more respective templates and will result in the creation of multiple data points having assigned the respective data series.

In step 110, the image analysis logic identifies, for each of the pixel sets, a data point for each of the templates whose degree of similarity to said pixel set exceeded the similarity threshold. For example, in case a particular pixel set matches to one template comprising a red triangle, a single new data point is created which has assigned the data series that corresponds to the red triangle. In case a particular pixel set partly matches to a first template comprising the red triangle and partly matches to a second template comprising the black circle, a first new data point is created which has assigned the data series that corresponds to the red triangle and a second new data point is created which has assigned the data series that corresponds to the black triangle. The data points are created at the plot image position where the respective template match was observed. In some alternative embodiments, only the identification of a particular data point at a particular position in the plot is performed based on the templates while the assignment of data series to that data points is based on other approaches, e.g. image feature-based clustering.

In step 112, the image analysis logic returns the identified data points and the data series to which the data points are assigned as the result of the image analysis. For example, the position and data series of an identified data point can be stored to a storage medium for later use by another application program or can be directly exported to an application program that further processes the data points extracted from the scatter plot.

For example, the extracted data can be imported into a spreadsheet application, a charting application, and/or an application for generating a presentation or any other kind of office application program. For example, the data can be exported as a .csv file to Microsoft Excel, PowerPoint or OpenOffice. For example, the extracted data is automatically copied to the clipboard for manually pasting the numbers in the form of a table in a document of an arbitrary application program, in particular a spreadsheet application program like Excel. The program receiving the extracted data may be configured and used for automatically creating a new chart from the extracted data.

According to embodiments, the application program that receives the extracted data is configured (e.g. by a user) such that a new chart is generated in accordance with a predefined and/or user selected layout and/or design setting. For example, the colors of the chart may be the colors in accordance with a corporate design of a company. Thus, charts published in many different layouts and color schemes in many different media may be used for automatically and/or semi-automatically creating charts in a desired layout and color scheme.

Figure 2:
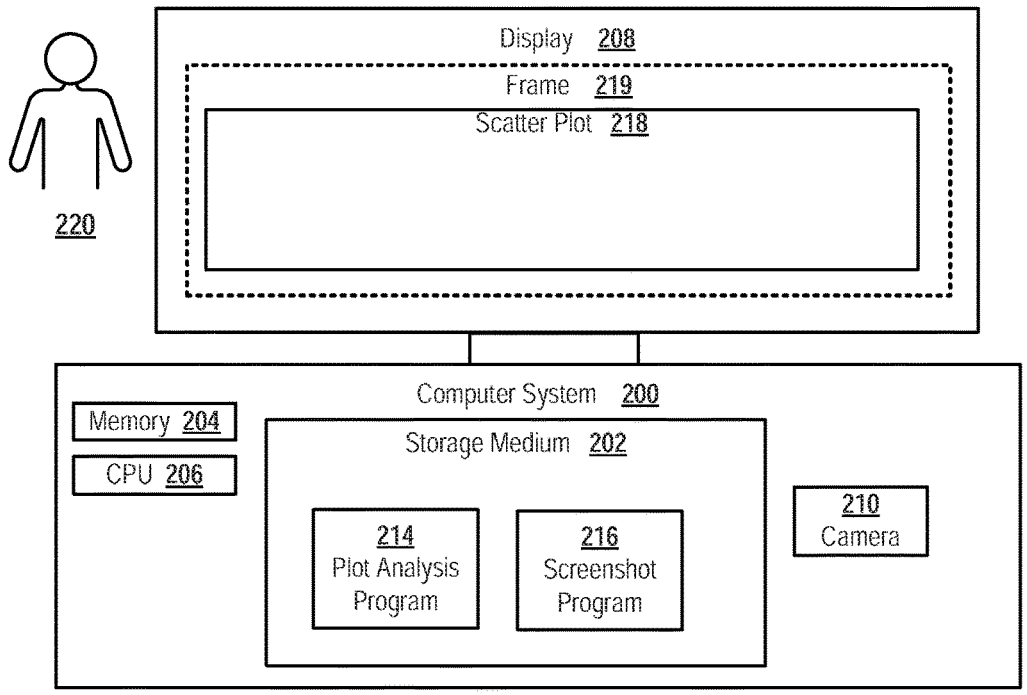
FIG. 2 depicts a computer system configured for extracting data from a scatter plot, according to one embodiment.

FIG. 2 depicts a computer system 200 of an embodiment of the invention that is configured for extracting data from a scatter plot 218. The extraction of data from a scatter plot may be advantageous as scatter plots are commonly used. The extraction of data from scatter plots has often been reported to be difficult due to problems to correctly identify the data points and series to which a particular data point belongs. Embodiments of the invention may allow the extraction of data from scatter plots in an efficient, error robust and accurate manner.

The computer system 200 can be a standard end-user computer system, a server computer system, and/or a mobile computer system such as a notebook, a tablet computer or a. smartphone. The computer system comprises a main memory 204, one or more processing units 206 and a non-volatile storage medium 202. The storage medium comprises computer interpretable instructions of one or more software application programs, e.g. of a plot analysis program 214 that implements the image analysis logic and/or of the software program that receives the extracted data, e.g. MS Excel (not shown). In addition, the computer system may comprise software or hardware based program logic for generating a digital image of a scatter plot, e.g. a screenshot program 216 or an image acquisition system 210, e.g. a camera. The computer system comprises or is coupled to a display device 208, e.g. an LCD screen. The image analysis logic 214 may implement and generate a user interface enabling a user 220 to trigger, monitor and optionally control the image acquisition, data extraction and data export/import process.

According to embodiments, the image analysis program is logic 214 as a plug-in, add-in or add-on of an office application, a spreadsheet application or of a program for generating electronic presentations such as MS PowerPoint.

According to some embodiments, the image analysis logic 214 in addiction comprises the screenshot generation logic 216.

According to some embodiments, the screen shot generation logic 216 is configured for generating a graphical user interface (GUI) that enables the user 220 to select the area of the screen area that displays the scatter plot 218 irrespective of the type of the application program that generated and rendered the chart and irrespective whether said application program is remote or local to the image analysis logic 214. Preferably, the GUI comprises a frame 219. The interior of the frame is transparent or semi-transparent for enabling the user to view the area of one or more screens currently covered by said frame. The frame is movable by the user over the screen and thus can be moved over the chart that is displayed on the one or more screens. The image acquisition logic 216 is configured to determine that the user has selected the screen area upon determining that the user has dropped the frame and is neither resizing nor moving the frame over the one or more screens. This determination automatically triggers the generation of a screenshot that depicts the scatter plot as the screenshot comprises the screen area that is covered by the frame.

Providing program logic that automatically starts analyzing and extracting data from a screenshot comprising a scatter plot may be advantageous as the number of man-machine interactions is significantly reduced. It has been observed that in particular on data processing devices with small displays, the selection of screen areas may not always capture a chart of interest completely or may capture dark background sections that may erroneously be considered as a bar by an image segmentation algorithm. The selection of screen areas may be erroneous particularly often on small screens as the selection may be performed with fingers or a comparatively large stylus and the finger or stylus may hide parts of the screen elements during the act of selection. As a consequence, the selected region may not cover a chart completely and chart data may be lost. Alternatively, the selected screen area may include graphical elements which are not part of the chart. In case those "extra-chart" objects have some similarity with chart elements, this may result in an erroneous identification of chart-external elements as chart components and in an erroneous data extraction. Thus, by providing a program logic that automatically generates a screenshot of a screen area covered by a frame upon a user "dropping" or "releasing" the frame over a selected display area, and by providing a program logic that automatically starts analyzing the generated screenshot with the scatter plot, the number of man-machine interactions (which are considered as particularly inconvenient and error prone on devices with small displays) may be minimized. Preferably, the program logic 216 is configured such that the act of selecting a different screen area automatically terminates any ongoing image analysis of a previously selected screen area and triggers the screen capturing and analysis of the newly selected screen area.

The GUI according to embodiments of the invention may enable a user to correct a wrong selection immediately without any additional steps for explicitly causing an ongoing analysis to terminate.

Using a frame 219 that automatically captures a screenshot upon being dropped by a user on a graphical user interface presented on one or more screens and that automatically starts to perform an image analysis, enables a user to extract data represented in a chart by a minimum of manual steps. Basically, the dropping of the frame on a suited position on a virtual desktop or the releasing of the frame by quitting any movement or resizing actions are sufficient for initiating the capturing of the screenshot and for starting the image analysis. No extra button or menu selection is necessary. The fact that a frame is kept on the same position and keeps its size is interpreted as a signal that indicates that the user considers the area covered by the frame as relevant, e.g. as completely covering a chart whose data shall be extracted. Then, after the image analysis has completed (and optionally, after some overlay GUI elements are displayed which indicate that the image analysis was able to correctly identify the relevant components of the chart), the user merely has to select the selectable GUI element, e.g. a selectable button or a selectable menu element, for triggering the capture module to output the data extracted by the image analysis step.

According to embodiments, the capture module is instantiated on a handheld, battery powered mobile telecommunication device, e.g. a smartphone or tablet computer. Using the frame for capturing a chart image may be particularly advantageous on those types of data processing system because typically the screens of said systems are small and any user-machine interaction is particularly error prone. Thus, ideally, the only two steps for data extraction from a chart that need to be performed by a user are the dropping of the frame at the appropriate position and the selection of the selectable GUI element after its appearance or enablement to initiate the data export to a target application or to the clipboard. Thus, erroneous or time consuming data entry steps which commonly occur when manually or semi-automatically extracting data from charts with small display devices can be avoided.

In a further beneficial aspect, the frame comprises a transparent or semi-transparent inner portion allowing a user to view the area covered by the frame except a small region covered by the outer pixel belt of the frame. The outer pixel belt of the frame can be, for example, opaque or semi-transparent. For example, the frame may have a solid border of about 10 pixels while its interior is completely transparent. The frame may have an initial size of e.g. 300 px×300 px and may be resizable by a user by a user's selection and repositioning of handles, e.g. selectable outer borders and/or corners of the frame.

FIG. 3a depicts a scatter plot 218 with data points of three different data series. A first data series "Animal group A" is represented by a black star. A second data series "Animal group B" is represented by a white circle. A third data series "Animal group C" is represented by a white star. For example, the city agreed different animal groups may represent animals belonging to three different species or may represent animals belonging to the same species but being treated with different tracks or different types of animal feed. The plot 218 depicts the size distribution in the three animal groups. In addition to the symbols of the respective data series, which represent individual data points, the plot comprises an x-axis, a y-axis, axis labels, axis units, and a title. The vast majority of data points is represented by an individual graphical symbol, e.g. an isolated white circle for data point 302, an isolated white star for data point 304 and an isolated black star for data point 306. Moreover, the plot comprises some overlays 308, 310, 312, 314, 316, of multiple different data points and corresponding symbols. Such overlaps can potentially cause errors such as the assignment of a wrong data series or the failure to identify a data point of a particular data series. Optionally, the plot image may comprise a legend. However, a legend is not necessary in order to identify templates comprising the data point symbols of the respective data series.

Figure 3B:
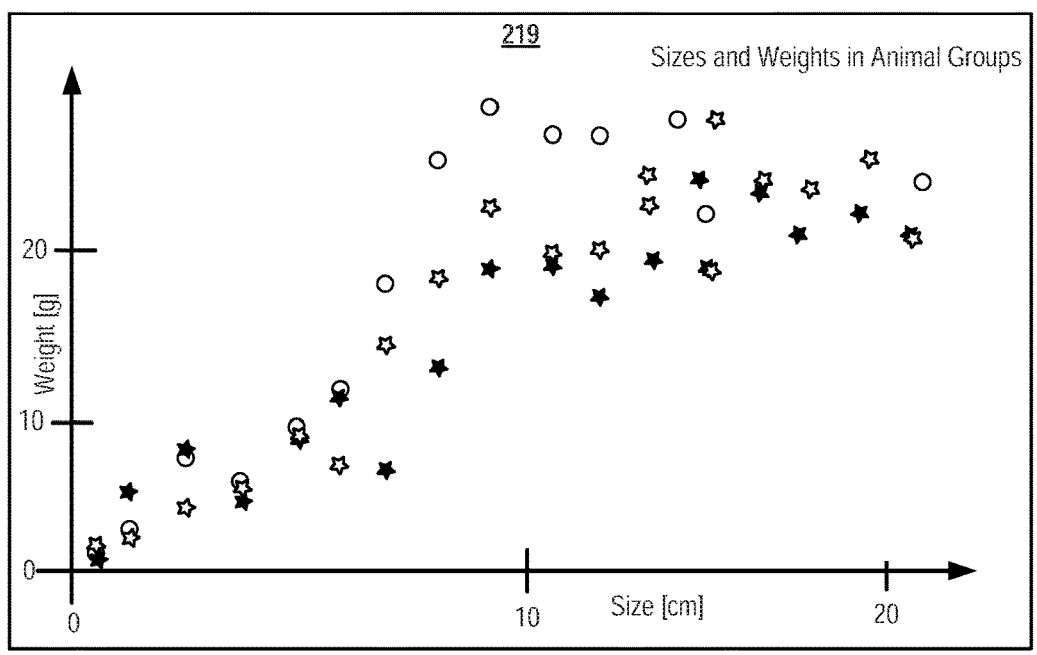
FIG. 3b depicts a further scatter plot with data points of three different data series.

FIG. 3b depicts a further scatter plot 219 with data points of three different data series (having the same meaning and symbology as described for FIG. 3a). The plot 219 depicts a plurality of data points belonging to the three different data series. The plot shows the distribution of size and the weight of the animals regarding to different animal groups.

Figure 4A:
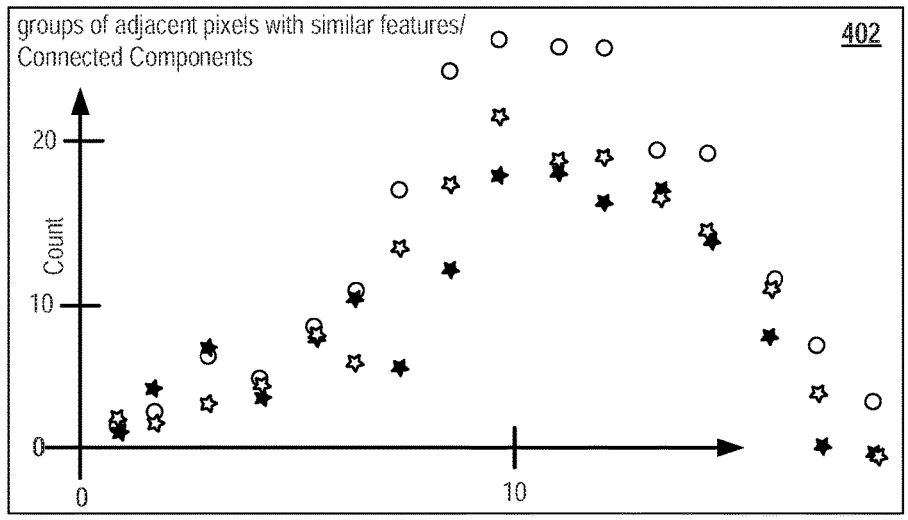

FIG. 4 depicts the process of extracting data from the scatter plot of FIG. 3a, according to one embodiment, In a step depicted in FIG. 4A, adjacent pixel groups of pixels which are similar to each other are identified, e.g. by means of a connected-component analysis, as "pixel sets" 402. For example, the pixels of the axes or of one axes may correspond to one pixel set. The pixels of each character of an axis label or of the title may correspond to one pixel set. The pixels of each symbol representing an isolated data point may correspond to a respective single pixel set. The pixels of each cluster of overlapping symbols of multiple data points may correspond to a respective single pixel set. Thus, the pixel sets or "blobs" depicted in FIG. 4A may represent data points, sets of overlapping data points, artifacts, labels, axes, characters and other object types that might cause errors.

Then, a first filtering operation may be applied on all pixel sets depicted in FIG. 4A for filtering out as many pixel sets whose size, shape, coloring or other visual features indicate that the pixel set does not represent a data point. For example, in case an optical character recognition (OCR) algorithm identifies a particular pixel set to represent a character of a label, said pixel set will not he considered as a potential data point. Likewise, if a pixel set is very large (or very wide or high), said pixel set likely represents an axis, not a data point, and is also filtered out. As a result of the first filtering operation, a filtered subset 404 of the pixel sets are obtained. Said sub-set is depicted in FIG. 413.

Figure 4B:
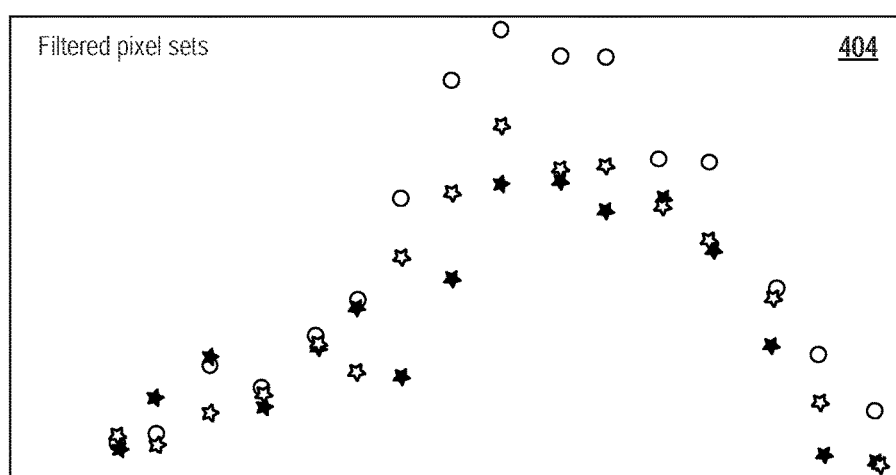
Figure 4C:
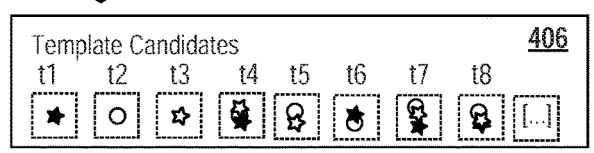

Then, template candidates as depicted in FIG. 4C are extracted. The extraction of template candidates can be performed, for example, by clustering the pixel sets depicted in FIG. 4B and using symbols whose features represent a respective cluster as a graphical object depicted in a template candidate. Alternatively, all pixel sets depicted in FIG. 4B can be compared with all other pixel sets and if two compared pixel sets are strongly similar or even identical, they are considered to represent the same symbol. Thus, the filtered set of pixel sets of FIG. 4B is analyzed for identifying unique graphical objects and each identified unique graphical object is represented as a template candidate 406 as depicted in FIG. 4C.

Figure 4D:
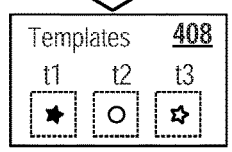

Then, a statistical analysis of the occurrence frequencies of the graphical objects of the template candidates is performed in order to identify template candidates which represent "valid" templates, i.e., which depict a graphical object that is a single data point symbol and not an overlay of multiple symbols or some image artifact or noise. In a typical scatter plot, the vast majority of data points will be displayed in the form of an isolated symbol. Thus, there will be only a few occurrences of specific overlaps of two different symbols and the number of identified graphical objects consisting of an overlay of three or more symbols may even be much smaller. Thus, template candidates t1, t2 and t3 will have a high frequency of occurrence in the plot 218 while the template candidates t4-t8 which correspond to overlays of multiple symbols will have a very low frequency of occurrence, e.g. only a single occurrence in the plot. Thus, by performing a statistical analysis of the occurrence frequencies, the actually valid templates 408 t1, t2 and t3 as depicted in FIG. 4D can be automatically identified for any kind of scatter plot image.

Figures 4E, 4F:
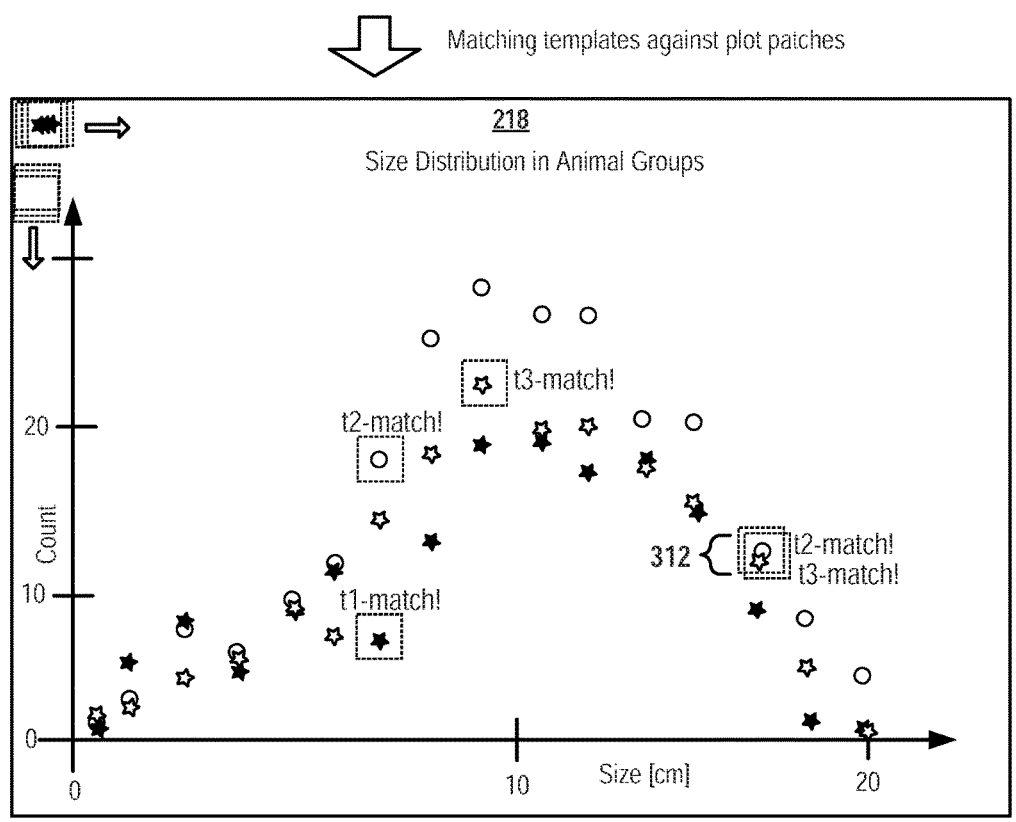

Then, each of the identified templates t1, t2 and t3 is compared with the pixel sets 402 in order to identify "match events". For example, each template can be compared in a sliding window approach with image plot pixels that are currently covered by said template (so called "image patches"). The template may be moved from left to right and from top to bottom by a predefined step width, e.g. a single pixel. Each time the template is moved one step, a similarity score in respect to the currently covered image patch is computed in order to detect complete matches (for isolated symbols) or partial matches (for parts of symbols which are not hidden by an overlaying other symbol). For example, the pixel set 312 as depicted in FIG. 4E corresponds to an overlap of two symbols and will yield in a complete match with template t3 and a partial match with template t2.

Thus, after having compared all templates to all patches of the image, a plurality of data points are identified in the plot and are used for creating data objects representing said data points. Any features of the pixel set which was identified to represent a data point may be assigned to the created data object representation of the data point. Said features may comprise, for example, the horizontal position, the vertical position, the size, the shape, the coloring, the texture and combinations thereof of graphical elements of the data point represented by said pixel set. The extracted features may be stored in the form of a table 410 as depicted in FIG. 4F.

According to embodiments, information that is extracted from the plot image via OCR may in addition be used for determining the x and y position of a data point not in pixel units but rather in the units of the axes and in accordance with the scale factor given by the axes. For example, axes labels, titles, numerical values, data point labels etc. may be used for determining the x and y position within the unit system of the scatter plot. In addition, some values in the dataset may be derived using interpolation and/or extrapolation techniques using values from textual representations on the chart image, relative sizes and/or locations of graphical features on the scatter plot image, etc.

For example, the analysis can include recognition of the representations of text, as well as pattern matching of the non-textual graphical features. Additionally, values can be interpolated and/or extrapolated from existing values. For example, it can be determined that the square and the textual representation "Animal group A" and "Animal group B" below the charting area of the plot image 218 of FIG. 3a are forming a chart legend. It can also be determined that the textual representation "0" on the left of the horizontal axis and the "10" on the right of the horizontal axis can be matched with horizontal axis labels. Additionally, values can be interpolated between 0 and 10 to yield the numerical values represented by data points. The extracted numerical data may comprise numerical data being indicative of the quantities of one or more elements of a data series. The numerical data could be computationally derived from the position of a data point as the vertical and horizontal position is in proportion to the values of the item represented by the data point. Thus, automatically extracting a dataset may include deriving information like axes labels from textual representations in the scatter plot image, e.g. by means of an OCR technique.

Additionally, the "20" next to a tick mark on the vertical axis can be determined to match with vertical axis labels. A data point value can be determined by comparing its position to the axes label positions and interpolated values. Those values can be used to produce a new data point for each of the data points identified in the scatter plot image. This procedure can yield a dataset that includes the determined values.

The extracted dataset 410 can be imported by a target application, e.g. MS Excel, and can be used by the target application to generate a chart that is linked to values in the dataset. For example, the dataset from analyzing the scatter plot image may be provided to a chart renderer program that is configured to generate and output a chart of different type or style than the type or style of the original scatter plot image. Said chart may be interactive, enabling the user to change a value in the dataset by editing a data point in the rendered chart or in the underlying data table, adjusting a data point's position.

The tabular data structure 410 may organize the extracted data point features such that one column comprises an indication of the assigned data series, a further column indicates the horizontal position and a further column indicates the vertical position of a data point. Each row corresponds to an individual data point. Alternatively, rows may represent the data series, the horizontal position and the vertical position and each column corresponds to a respective data point. According to other embodiments, for each data series a respective tabular data structure is created, whereby the vertical position and the horizontal position are represented by columns and each data point corresponds to a row or vice versa. The tabular data may comprise a numerical data value, ordinal values, nominal values or combinations thereof in each table cell or typically a text string in the series column or row, respectively.

According to embodiments, the outputting of the extracted data comprises exporting the extracted data into a first application program configured for automatically generating charts from tabular data structures; and generating, by the first application program, a new chart from the extracted data. For example, the first application program may be Microsoft PowerPoint or Microsoft Excel which enables a user to select a table and generates a new chart within PowerPoint from the data in a selected table with a very limited set of user interactions.

In addition, or alternatively, the outputting of the extracted data comprises exporting the extracted data into a second application program configured for automatically analyzing numerical data contained in tabular data structures, e.g. statistical analyses; and outputting, by the second application program, a numerical result generated by the analysis of the extracted data. For example, the second application can also be Excel or a statistical or mathematical application, whose inbuilt or predefined mathematical functions (SUM, AVERAGE, user-defined) may be applied to the data.

FIG. 5 illustrates an example scatter plot image for analysis and manipulation by the tools, methods and program logic described herein, according to one embodiment. In particular, FIG. 5 shows a user interface 10 having a sample static scatter plot image 14 selected/uploaded into a canvas 12 (such as a pdf document, an image, a display interface, and the like). In this example, during a data identification mode, the digitization system described herein identifies (for instance, automatically or at the request of a user of the digitization system) the five circular data points of the plot image 14 as scatter plot points and marks these data points with five crosshair markers 18 overlapping the circular data points of the plot image 14. The digitization system also identifies the x and y axes of the plot image 14. Each axis is then marked with orthogonal line markers overlapping the axes of the scatter plot image 14. Both the axes markers 16 and data point markers 18 are objects that are populated within an overlay interface of the plot image 14 that correspond to data components of the plot image 14. A user of the digitization system can manually interact with the axes markers 16 and data point markers 18 when the digitization system is configured in a manual curation mode, for instance by moving the markers, by removing markers (for instance, markers that were populated within the overlay interface by the digitization, but that don't correspond to desired data components or to data components at all), and by adding additional markers (for instance, to add markers that correspond to data components that were not identified by the digitization system). The axes markers 16 may be lines parallel to or overlapping the axes of the plot image 14. In some embodiments, the axes markers 16 may be two or more points, representative of a line along the axes of the plot image 14. The axes markers 16 may be longer than, shorter than, or of equal length to the axes represented in the plot image 14.

Finally, although the axis/axes marker(s) are intended to correspond to the axis/axes present on the image, this functionality is not restrictive. For instance, axis markers can be added where there exists no axis in the original image and/or the user may opt to define their own axis/axes in the image if desired. The axes ranges (for example numerical ranges, date ranges, etc.) for each axis are identified by the digitization system using optical character recognition (OCR) of the appropriate axis labels if the labels are included within the image. Furthermore, users are able to manually add, edit, and/or delete these textual identifiers in the user interface. The data point markers 18 may be any shape for instance, elliptical markers, polygonal markers, or crosshairs that identify the locations of data points in the plot image 14.

in the example of FIG. 5, only one data series representing a single data set is presented; however, in other embodiments with multiple data series representing multiple data sets, each series within the plot image 14 can be distinguished using data point markers 18 of different colors, patterns, or shapes, enabling a user to differentiate between different data series within the plot image 14.

The names for each distinct series can be identified by the digitization system using optical character recognition (OCR) of the legend of the plot image 14 if one exists or some other display of series names. Furthermore, users can manually add, edit, and/or delete these textual identifiers in the user interface. When the digitization system is configured in a data extraction mode, the digitization system can store all data components (such as those automatically identified by the digitization system and those manually curated by a user) within a data grid. In some embodiments, data points are stored with corresponding (x,y) coordinates. The position of a data point marker 18 relative to the axes markers 16 provides an (x,y) coordinate for a data point represented in the plot image 14, scaled appropriately to the respective axes ranges as described above.

Note that an x or y coordinate may instead correspond directly to series labels as described above, depending on the chart type. For instance, a bar chart in which each bar corresponds to a representative textual label may utilize such labels as the x axis marker labels, rather than using its computed horizontal coordinate position relative to the x axis marker. After an (x,y) coordinate is computed for each data point marker, the (x,y) coordinates of all data point markers are stored in a data grid, organized, for instance, by data type, data series, and the like. The user may then access the data grid of these (x,y) coordinates, along with their corresponding series labels, either directly in the user interface 10 or via some third party program, such as Microsoft Excel.

The digitization system enables a user to manipulate the data within the data grid itself, or to customize or manipulate a display of the data (for instance, a display within the canvas 12). For instance, the digitization system allows a user to adjust the markers for data points 18 or axes 16 directly on the canvas 12, or to add a secondary x or y axis marker to the canvas 12. The digitization system also allows a user to clear any and all data point markers 18 from the canvas 12, to zoom in or out of data displayed within the canvas 12, to increase or decrease the size of the plot image 14 relative to the user interface, and to undo/redo actions taken with regards to the data or the display of the data. The digitization system can also allow a user to move or re-size the axes line markers 16 or the data point markers 18, or can allow a user to re-categorize data (e.g., assign particular data points to a different data series), to add additional data manually, or to delete data.

The digitization system also enables a user to turn off the automated scanning and identifying of data within an image plot, and can instead enable a user to manually add all axes markers 16, data point markers 18, axes labels, and series labels to the image canvas 12 or the user interface 10.

FIG. 6 illustrates example line charts for analysis and manipulation by some of the tools and methods described herein, according to one embodiment. In FIG. 6, a static line chart plot image 22 is loaded to the canvas and the automatic digitization system identifies the curved line as the singular data set. All data points in the computed line are stored in memory and available to be used in the user interface, based on sensitivity preferences outlined below. For instance, a model representative of the line can be generated and stored, enabling a user to generate any number of discrete data points within the line, or to generate the continuous line itself. In the initialized embodiment 20, six evenly spaced crosshair markers 26 overlay the line element 24 of the line chart plot image 22. The six (x,y) coordinates corresponding to the six crosshair markers 26 relative to the axes lines are stored in a data grid, which the user may access. As in FIG. 5, the user may modify the data point markers 26, which would result in changes to the data grid, or the user may modify the data grid directly. The user may adjust the sensitivity of the data point marker density for line charts to increase or decrease the number of data point markers along the line. One such modification is shown in the modified embodiment 28, in which the user has increased the line chart sensitivity so that there are twenty crosshair markers 30 overlaying the line element 24 of the line chart plot image 22. This modification results in twenty (x,y) coordinates being stored in the data grid, which the user may access and then potentially modify. In the case that a line chart plot image contains one or more series with discrete (i.e., non-continuous) lines, optimal discrete points are automatically detected based on inflection points in the line and even spacing in the line segments making up the line. As discussed above, these points are then identified with markers, setting the initial density (as illustrated in the embodiment of FIG. 6). As above, the user may then modify these data point markers by adding, subtracting, deleting, or otherwise modifying the markers, including increasing or decreasing the density of the data point markers, thereby increasing or decreasing the number of (x,y) coordinates in the data grid.

FIG. 7 is a flow chart illustrating a process for digitizing data representations, according to one embodiment. A user selects 32 a plot image for processing by the digitization system. The selected plot image includes one or more implicit or explicit axes and a visually represented data set. The visual indicators of the data set could be lines, polygons, ellipses, crosshairs, arbitrary shapes, etc. For example, the data sets of a line chart plot image could be represented via solid, dashed, or dotted lines. For example, the data sets of a column chart plot image could be represented via rectangles.

An inner morphological gradient filter, performed by taking a morphologically dilated image minus the original image, is applied 34 to each red-green-blue (RGB) color channel of the original image to produce three new single-channel (grayscale) images, a, b, and c. A composite grayscale image, x, is then computed from a, b, and c by selecting the maximum pixel value at each pixel coordinate in an image from images a, b, and c and storing the selected maximum pixel value into x. One or more optimal threshold computations (such as the global statistical mean and the standard deviation of pixel intensities within x), are performed 36 on x to produce a binary image featuring the contours of the graphical objects in the original image. The collection of individual connected components in the image is computed and each of these elements is used to segment, locate, and label the set of data components in the image as outlined below.

Elements corresponding to an above-threshold size and/or frequency in the plot image which are neither text nor gridlines are identified 38 as data point symbols of the data set in the plot image. For example, in a scatter plot image, the most frequently recurring elements of similar shape and size—such as a small circle, rectangle, or crosshair—are identified as data point symbols in the plot image. Likewise, in a line chart image, elements (or collections of adjacent elements with similar coloring or patterns) which span an above-threshold portion of horizontal width of the line chart image are used to identify individual data lines in the image.

Elements similar to the identified data point symbols are identified 40 and included within the set of data point objects. For instance, image elements with similar dimensions and/or locations to the identified data points are included within the set of data point objects. For example, in a scatter plot image with an above-threshold number of 3 pixel diamonds, all elements of similar size and shape, such as a 3.2 pixel diamond, are also included as part of the data set. Likewise, in a column chart image, all groups of rectangles of similar width which are approximately equidistant from one another can be identified as part of the data set.

The identified set of data points are segmented 42 into different data series each including a plurality of data points, based, for instance, on the locations, spacings, coloring, patterns, and/or shapes of the image elements they represent. For instance, if a line chart plot image contained three lines of different colors, red, blue, and yellow, the digitization system segments the data into three separate series, with data sets corresponding to each line based on color. Similarly, if a scatter plot image contained two types of data point elements, circles and diamonds, the digitization system segments the data into two separate series, with one data set corresponding to all circle elements of the plot image and one data set corresponding to all diamond elements of the plot image. As discussed below, the different series are identified with distinct markers and are separated into partially or wholly distinct data sets in the data grid.

Once all data points in the plot image are identified, a bounding box is initialized 44 enclosing all elements of the data set. In some embodiments, the bounding box is deformed so that its edges reside on the vertical and horizontal axes lines of the plot image. The axes are then identified 46 as the line segments representing the edges of the bounding box. The textual labels, including series labels, chart title(s), axes range values, etc. are identified and extracted using optical character recognition (OCR).

All extracted components of the plot image, including data points, axes markers, and textual labels (series labels, chart title(s), axes range values, etc.) are visually presented in the user interface 50, as specified below in steps 52-56.

The identified data points are marked 52, and the identified axes are marked 54 with polygons, crosshairs, or lines on the canvas overlaying the plot image. The textual labels, including series labels, chart title(s), axes range values, etc., are visually presented in the user interface 56 such that the user may manipulate these elements.

Distinct markers—typically distinct by color, but also potentially by shape or size—are used to represent different series identified in 52. The data grid discussed below then displays the (x,y) coordinates in separate data sets, which may be completely distinct (as in the case of a scatter plot where each data set may be uncorrelated) or overlapping (as in the case of a column chart, where the x axis is the same for all series)

In some embodiments, the numerical, date, or other measure of range of the axes at the maximum and minimum points of the axes markers are identified 56 using optical character recognition on the plot image to identify characters within the plot image representative of the range of the axes. Further, series labels from chart legends and from the labels on the axes are automatically identified using optical character recognition.

The automatically computed results of data point identifiers and coordinates, series categorization of each point, axis locations and lengths, and textual labels for the axes, series, and overall plot are stored by the digitization system and are presented in the user interface as described in above.

The digitization system and corresponding image analysis logic according to embodiments of the invention automatically identifies a data set represented in a plot image of a document so users do not have to manually mark and label data points of the plot image. The digitization system further automatically identifies the series names and which data points belong to which series so users do not have to manually mark the series names and assign data points to series. In addition, the digitization system also automatically identifies the axes and axes ranges so users do not have to manually mark the axes and input the axes range values. Finally, the digitization system allows users to adjust the markers and textual series and axes labels, wholly or in part, directly in the application, which immediately updates the numerical values in the data grid.

While the foregoing written description enables one of ordinary skill to make and use what is considered presently to be the best mode thereof, those of ordinary skill will understand and appreciate the existence of variations, combinations, and equivalents of the specific embodiment, method, and examples herein. This description should therefore not be limited by the above described embodiment, method, and examples, but by all embodiments and methods within the scope and spirit of the invention.

As will be appreciated, one or more substantial benefits can be realized from the methods and systems described herein, such as making it more convenient to extract data from scatter plots. However, the subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various way, in which particular techniques can be used in conjunction with other techniques.

Techniques described herein may be used with one or more of the systems described herein and/or with one or more other systems. For example, the various procedures described herein may be implemented with hardware or software, or a combination of both. For example, dedicated hardware logic components can be constructed to implement at least a portion of one or more of the techniques described herein. For example, and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various embodiments can broadly include a variety of electronic and computer systems. Examples of well-known computing system configurations that may be suitable for use with the tools and techniques described herein include, but are not limited to, server farms and server clusters, personal computers, server computers, smartphones, laptop devices, slate devices, game consoles, multiprocessor systems, microprocessor-based systems, programmable consumer electronics, network PCs, minicomputers, mainframe computers, distributed computing environments that include any of the above systems or devices, and the like. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing, Moreover, virtual computer system processing can be constructed to implement one or more of the techniques or functionality, as described herein.

The invention claimed is:

1. A computer-implemented method for automatically extracting data from a scatter plot, the method comprising:
   receiving a digital image of a scatter plot;
   analyzing the received digital image for identifying a plurality of pixel sets in the received scatter plot image or in a derivative of the received image, each identified pixel set being a group of adjacent pixels;
   generating a plurality of templates based on the identified pixel sets, each template being a pixel structure that depicts one single data point symbol, each template representing a respective data series;
   comparing each of the templates with pixels of a target image, the target image being the received scatter plot image or the derivative of the received scatter plot image, for identifying positions of matching templates, a matching template being a template whose degree of similarity to pixels of the target image exceeds a similarity threshold;
   at each position in the target image where a template match occurred, identifying a data point for the matching template and assigning to the identified data point one of the data series; and
   returning the identified data points and the data series to which it is assigned.

2. The method of claim 1, the received image being a binary image.

3. The method of claim 1, wherein the received image is a single-channel grayscale scatter plot image or a multi-channel scatter plot image, the identification of the pixel sets comprising:
   generating the derivative of the received scatter plot image by transforming the received scatter plot image into a derivative image, wherein the derivative image is an edge image that depicts contours of graphical objects in the scatter plot image;
   performing the identification of the pixel sets by
      mapping the identified contour pixels to respective pixels in a template-generation-image, the template-generation-image being the received scatter plot image or a derivative version of the received scatter plot image; and using all pixels in the template-generation-image to which a contour of a graphical object is mapped or which lie within the mapped contour of said graphical object as one of the identified pixel sets, wherein the comparing of the templates with the pixel sets is performed in the pixels of the template-generation-image; or
      using all pixels in the edge image which are contour pixels of a graphical object or which lie within the contour of said graphical object as one of the identified pixel sets, to be used for generating the templates.

4. The method of claim 1, the identification of the pixel sets comprising:

identifying a plurality of pixel blobs in the received digital image or in the derivative image, each pixel blob being a group of adjacent pixels with similar image features; and using the identified pixel blobs as the pixel sets.

5. The method of claim 1, wherein the received image is a multi-channel-image and wherein the method further comprising creating a binary image from the multi-channel image, the creation of the binary image comprising:

receiving a multi-channel image of the scatter plot;

decomposing the received multi-channel image into multiple single-channel images;

creating an edge image from each single-channel-image, each edge image selectively comprising pixels being indicative of the contours of graphical objects depicted in the received digital image, if any;

generating a composite grayscale image by determining, at each pixel position in the received digital image, the maximum pixel value of all created edge images, and by storing said determined maximum at the corresponding pixel position;

transforming the composite grayscale image into the binary image, the binary image being an edge image comprising contours of graphical objects.

6. The computer-implemented method of claim 1, the generation of the templates comprising:

analyzing the identified pixel sets for identifying and filtering out pixel sets whose at least one of position, coloring, morphology or size indicates that said pixel set cannot represent a data point, thereby filtering out at least one of plot labels, gridlines or axes; and selectively using the non-filtered out pixel sets for generating template candidates, each template candidate comprising a graphical object that represents a single data point symbol or a combination of data point symbols or other objects other than a single data point symbol.

7. The computer-implemented method of claim 6, further comprising:

determining the occurrence frequency of the graphical object of each template candidate in the scatter plot image;

identifying and filtering out template candidates comprising a graphical object whose occurrence frequency in the scatter plot is below a threshold, thereby filtering out template candidates with a graphical object that represents an overlay of two or more data point symbols and template candidates with other rarely occurring objects;

selectively using the non-filtered out template candidates as the templates, each template comprising one single data point symbol.

8. The computer-implemented method of claim 1, the generation of the templates comprising:

analyzing the identified pixel sets for identifying and filtering out pixel sets whose at least one of position, coloring, morphology or size indicates that said pixel set cannot represent a data point, thereby filtering out at least one of plot labels, gridlines or axes; and selectively clustering the non-filtered out pixel sets by image features into clusters of similar pixel sets, the image features being selected from a group comprising coloring features, morphological features and size, identifying and filtering out clusters having a number of member pixel sets below a threshold, thereby filtering out clusters representing a graphical object that represents an overlay of two or more data point symbols or that represents another rarely occurring object;

selectively for each of said non-filtered out clusters, creating a graphical object that represents a data point symbol that is most similar to all pixel sets within said cluster and creating a template, the template comprising said graphical object as the one single data point symbol depicted in the template.

9. The computer-implemented method of claim 1, the comparing of the templates with the target image being implemented as a sliding window method, the sliding window method comprising moving the template across the target image, thereby comparing the pixels of the template with the pixels of each currently covered patch of the target image, each patch being an image region of the target image being currently covered by the template.

10. The method of claim 1, the comparing of the templates with the target image comprising:

mapping the identified pixel sets used for generating the templates to respective pixels in the target image; and comparing the templates selectively with image patches in the target regions comprising at least one pixel to which the identified pixel sets were mapped.

11. The method of claim 1, the comparison of the templates with the pixels of the target image being performed by a comparison function, wherein the comparison is configured such that in case one of the template matches at least a minimum fraction of the pixels of one of the patches in the target image, the comparison function returns at least the degree of similarity of the template and the patch, and whereby after one of the templates was found to match with an image patch, at least one further one of the templates is compared with a copy of the image patch that lacks the pixels of the matching template for identifying also partially matching templates.

12. The method of claim 11, the minimum fraction being in a range of 10%-40% of the pixels of the patch.

13. The method of claim 11, wherein the comparison identifies at least two templates which respectively have a degree of similarity to the pixels of the same image patch that exceeds the similarity threshold, wherein a data point is created and returned for each of said at least two templates, each of the at least two data points having assigned a different data series represented by the template for which the data point was created.

14. The method of claim 1, the comparing of the pixels of the template with the pixels of each currently covered image patch of the target image comprising:

calculating the correlation coefficient or normalized correlation coefficient between the image patch pixels and the template pixels; or calculating the cross-correlation or normalized cross-correlation between the image patch pixels and the template pixels; or calculating the sum of squared differences or normalized sum of squared differences between the image patch pixels and the template pixels.

15. The method of claim 1, the comparing of the templates with the image patches in the target image comprising:

generating downsized versions of the templates;

generating a downsized version of the target image;

performing a first comparison operation, the first comparison operation comprising comparing patches of the downsized target image with the downsized template versions for identifying image regions of interest in the downsized target image which are similar to one or more of the downsized templates;

performing a second comparison operation selectively for the identified digital image regions of interest, the second comparison operation comprising comparing patches of the original target image with the original version of the one or more templates being similar to the region of interest, wherein the degree of similarity is determined for said patch of the original target image and the one or more templates being similar to the region of interest identified in the first comparison operation.

16. The method of claim 15, the generation of the downsized versions of the templates comprising:

checking if the dimensions of the templates are within a predefined dimension range;

if the templates are larger than the predefined dimension range, creating downsized template versions which fit into the predefined dimension range;

the generation of the downsized version of the digital image comprising:

the generation of the downsized versions of the templates comprising downscaling the received digital image by the same scaling factor used for downscaling the templates.

17. The method of claim 1, the assigning of the data series to the identified data points comprising clustering data points in dependence on at least one of their size, morphology or coloring into clusters of data points having similar appearance.

18. The method of claim 1, the assigning of the data series to the identified data points comprising assigning to each identified data point the data series represented by the matching template for which the data point was created.

19. The method of claim 1, further comprising at least one of:

exporting the position and the associated data series of all identified data points to a receiving software application;

storing the position and the associated data series of all identified data points to a storage medium;

displaying the position and the associated data series of all identified data points in tabular form on a screen; or displaying the identified data points as a newly generated chart having a customized design on a screen.

20. The method of claim 1 being implemented as a plug-in, add-on or add-in of a spreadsheet application, an office application or of an application for generating electronic presentations.

21. A tangible non-volatile storage medium comprising computer-interpretable instructions stored thereon, the instructions, when executed by a processor, causing the processor to perform a method for extracting data from a scatter plot, the method comprising:

receiving a digital image of a scatter plot;

analyzing the received digital image for identifying a plurality of pixel sets in the received scatter plot image or in a derivative of the received image, each identified pixel set being a group of adjacent pixels;

generating a plurality of templates based on the identified pixel sets, each template being a pixel structure that depicts one single data point symbol, each template representing a respective data series;

comparing each of the templates with pixels of a target image, the target image being the received scatter plot image or the derivative of the received scatter plot image, for identifying positions of matching templates, a matching template being a template whose degree of similarity to pixels of the target image exceeds a similarity threshold;

at each position in the target image where a template match occurred, identifying a data point for the matching template and assigning to the identified data point one of the data series; and returning the identified data points and the data series to which it is assigned.

22. A computer system comprising one or more processors and memory comprising instructions stored thereon, the processors being configured for extracting data from a scatter plot, the extraction of the data comprising:

receiving a digital image of a scatter plot;

analyzing the received digital image for identifying a plurality of pixel sets in the received scatter plot image or in a derivative of the received image, each identified pixel set being a group of adjacent pixels;

generating a plurality of templates based on the identified pixel sets, each template being a pixel structure that depicts one single data point symbol, each template representing a respective data series;

comparing each of the templates with pixels of a target image, the target image being the received scatter plot image or the derivative of the received scatter plot image, for identifying positions of matching templates, a matching template being a template whose degree of similarity to pixels of the target image exceeds a similarity threshold;

at each position in the target image where a template match occurred, identifying a data point for the matching template and assigning to the identified data point one of the data series; and returning the identified data points and the data series to which it is assigned.

* * * * *